(12) United States Patent
Li et al.

(10) Patent No.: US 12,223,764 B2
(45) Date of Patent: Feb. 11, 2025

(54) SYSTEM AND METHOD FOR ROTATION INVARIANT FINGERPRINT RECOGNITION

(71) Applicant: Armatura LLC, Alpharetta, GA (US)

(72) Inventors: Zhinong Li, Alpharetta, GA (US); Xiaowu Zhang, Alpharetta, GA (US)

(73) Assignee: ARMATURA LLC, Alpharetta, GA (US)

( * ) Notice: Subject to any disclaimer, the term of this patent is extended or adjusted under 35 U.S.C. 154(b) by 391 days.

(21) Appl. No.: 17/682,923

(22) Filed: Feb. 28, 2022

(65) Prior Publication Data

US 2023/0274574 A1   Aug. 31, 2023

(51) Int. Cl.
  *G06V 40/12*   (2022.01)
  *G06F 21/32*   (2013.01)
  *G06V 10/44*   (2022.01)
  *G06V 10/82*   (2022.01)

(52) U.S. Cl.
  CPC .......... *G06V 40/1347* (2022.01); *G06F 21/32* (2013.01); *G06V 10/454* (2022.01); *G06V 10/82* (2022.01)

(58) Field of Classification Search
  CPC ................ G06V 10/454; G06V 10/82; G06V 40/12–1394; G06V 40/1347–1376; G06V 40/1365; G06T 2207/20048–20064; G06T 3/147; G06T 3/14; G06T 1/0064; G06T 3/02; G06T 3/00–608; G06T 7/00–97; G06T 2207/20084; G06N 20/00–20; G06N 20/10; G06F 21/32; G06F 18/20–295; G06F 3/041–04897; G06F 18/23–2337; A61B 5/1172
  See application file for complete search history.

(56) References Cited

U.S. PATENT DOCUMENTS

| | | | |
|---|---|---|---|
| 2021/0027041 A1* | 1/2021 | Aragon .............. | G06V 40/1318 |
| 2021/0089901 A1* | 3/2021 | Smeulders .............. | G06N 3/08 |
| 2021/0272233 A1* | 9/2021 | Kondor .................. | G06F 17/14 |

\* cited by examiner

*Primary Examiner* — Amr A Awad
*Assistant Examiner* — Aaron Midkiff
(74) *Attorney, Agent, or Firm* — Venable LLP

(57) ABSTRACT

The present teaching relates to method, system, medium, and implementations for biometric authentication. Rotation covariant convolution kernels at multiple convolution layers are obtained with weights learned via machine learning based on rotation invariant (RI) training data. For an input image with fingerprint information captured therein related to a person to be authenticated, an initial feature map is obtained and then at each convolution layer, a feature map is processed based on the RC convolution kernels for the layer to output a rotation covariant (RC) feature map, with the feature map being either the initial feature map and an output RC feature map from a previous convolution layer. The last convolution layer outputs a rotation invariant (RI) feature vector representing fingerprint features of the person in a rotation invariant manner, which is then used to authenticate the person.

18 Claims, 25 Drawing Sheets

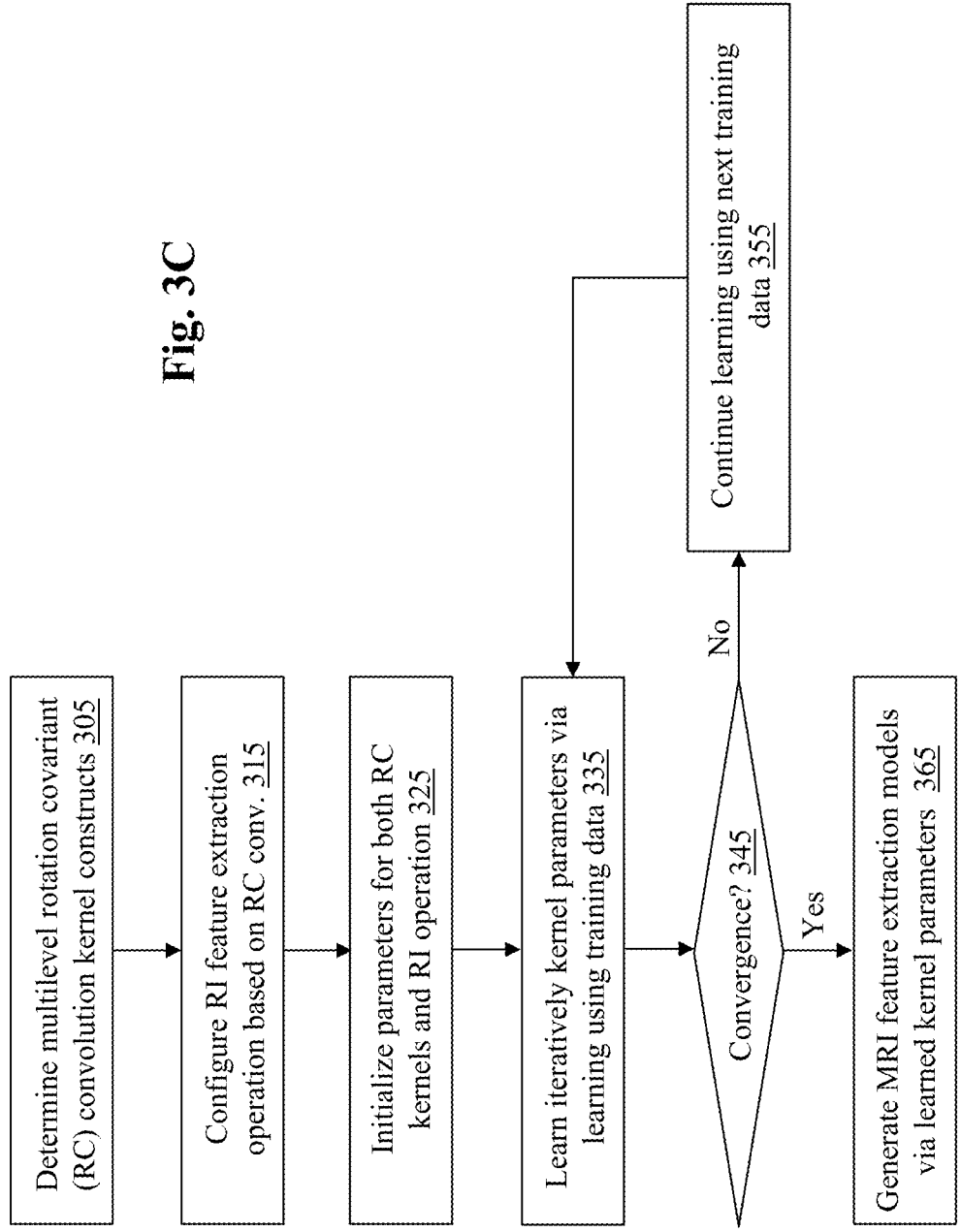

SYSTEM AND METHOD FOR ROTATION INVARIANT FINGERPRINT RECOGNITION

BACKGROUND

1. Technical Field

The present teaching generally relates to authentication. More specifically, the present teaching relates to authentication via biometric information.

2. Technical Background

With the development of the Internet and the ubiquitous network connections, more and more secure access controls are done via biometrics. For example, almost all smart phones nowadays have either fingerprint or face based biometrics authentication. Some public places such as airports and government buildings, access to such places may also be controlled via biometric-based authentication. Private companies have also used biometrics to monitor not only the access to workplaces but also the working hours of employees. Different types of biometrics may now be used for authentication, including fingerprint, finger veins, faces, palms, and palm veins. FIG. 1A shows an example of using fingerprints for authentication in, e.g., access control. In this example, a person who is to be authenticated may place a finger over a fingerprint based authentication device, e.g., device 100 as shown in FIG. 1A. The imaging sensors deployed in the device 100 may then acquire the fingerprint image 120, which is then processed to extract relevant features in order to identify a persons' identity. Other types of biometric information may also be used for identifying a person. For instance, finger vein, palm, or palm vein, and faces may also be used for authentication. To do so, it is important to accurately detect the unique features associated with different people.

It is well known that authentication using fingerprints traditionally requires that various fine and specific features exhibited on fingerprints and the spatial configurations thereof be extracted from fingerprint images and then such fine features are used to uniquely identify a person. There are different challenges associated with reliably detecting distinguishing features that enable trustworthy authentication. In recent years, focus has been placed on addressing such challenges in biometric based authentication. For instance, detecting such fine features may be quite sensitive to the quality of an imaging capturing a finger. A blurry image may be caused by different reasons, such as greasy surface on the device where the finger is placed, movement of the finger, or conditions of the finger, which includes a sweaty, oily, or dirty finger. When a fingerprint image does not truly represent the finger used for authentication, it makes it difficult to locate needed features.

Another issue that computer based biometric system is sensitive of is related to the orientation of a finger. For example, the image locations of branch points in a person's fingerprint vary with the orientation of the finger. As shown in FIG. 1A, a person may place a finger on a fingerprint based authentication device in a causal manner, making it likely that the orientation of the finger varies each time. Traditionally, to recognize a person, fine features of the fingerprints may be detected which include, e.g., branch points 130 defined as a meeting point of two curves. As shown in FIG. 1A, a person places a finger on device at one time, yielding image 1 120 and the same person places the same finger next time with a different orientation, yielding image 2 150 with a different orientation than that of image 1 120, as shown in FIG. 1A. Consequently, locations of the feature points 130 detected from image 1 120 also differ from the feature points locations 160 detected from image 2 150. While the features are different, they correspond to the same person and should be recognized as such. Thus, fingerprint based authentication needs to be rotation invariant, i.e., the result does not change when the difference of features detected at different times are merely caused by a difference in orientation of the biometrics presented.

Different efforts have been attempted to achieve rotation invariant feature extraction and recognition. The traditional approaches on rotation invariant feature detection are illustrated in FIG. 1B. To make a system rotation invariant, some conventional approaches use single layer rotation invariant recognition strategy, and some adopt to rely on a two-stage processing. In the two-stage processing, an angle of the rotation of the fingerprint is first estimated in the first stage. Then the estimated angle is used to guide the processing in the second stage for feature extraction and recognition. The single layer solution is not robust. The two-stage solution still requires extracting fingerprint features, which is often not reliable, either, due to various reasons, such as rotations, oily fingers, or any residuals on the fingers. Thus, the effectiveness of the traditional solutions can be limited.

Thus, there is a need for enhanced rotation invariant biometric authentication on fingerprint images that achieves a more robust performance.

SUMMARY

The teachings disclosed herein relate to methods, systems, and programming for information management. More particularly, the present teaching relates to methods, systems, and programming related to hash table and storage management using the same.

In one example, a method, implemented on a machine having at least one processor, storage, and a communication platform capable of connecting to a network for biometric authentication. Rotation covariant convolution kernels at multiple convolution layers are obtained with weights learned via machine learning based on rotation invariant (RI) training data. For an input image with fingerprint information captured therein related to a person to be authenticated, an initial feature map is obtained and then at each convolution layer, a feature map is processed based on the RC convolution kernels for the layer to output a rotation covariant (RC) feature map, with the feature map being either the initial feature map or an output RC feature map from a previous convolution layer. The last convolution layer outputs a rotation invariant (RI) feature vector representing fingerprint features of the person in a rotation invariant manner, which is then used to authenticate the person.

In a different example, a system is disclosed for biometric authentication. The system includes a multilevel rotation invariant (MRI) based model learning unit, an imaging unit, an image preprocessing unit, an MRI feature extractor, and an MRI recognition unit. The MRI based model learning unit is configured for obtaining, for each of a plurality of convolution layers, rotation covariant (RC) convolution kernels with weights derived via machine learning based on rotation invariant (RI) training data. The imaging unit is configured for receiving an input image with fingerprint information captured therein related to a person to be authenticated. The image preprocessing unit is configured for preprocessing the input image to obtain an initial feature map. The MRI feature extractor is configured for processing, at each of the plurality of convolution layers, a feature map based on the RC convolution kernels for the layer to output a rotation covariant (RC) feature map, where the feature map is one of the initial feature map and an output RC feature map from a previous one of the plurality of convolution layers, and the RC feature map output by the last one of the plurality of convolution layers corresponds to a feature vector representing fingerprint features of the person in a rotation invariant manner. The MRI recognition unit is configured for authenticating the person based on the rotation invariant (RI) feature vector.

Other concepts relate to software for implementing the present teaching. A software product, in accordance with this concept, includes at least one machine-readable non-transitory medium and information carried by the medium. The information carried by the medium may be executable program code data, parameters in association with the executable program code, and/or information related to a user, a request, content, or other additional information.

Another example is a machine-readable, non-transitory and tangible medium having information recorded thereon for biometric authentication. The information, when read by the machine, causes the machine to perform various steps. Rotation covariant convolution kernels at multiple convolution layers are obtained with weights learned via machine learning based on rotation invariant (RI) training data. For an input image with fingerprint information captured therein related to a person to be authenticated, an initial feature map is obtained and then at each convolution layer, a feature map is processed based on the RC convolution kernels for the layer to output a rotation covariant (RC) feature map, with the feature map being either the initial feature map or an output RC feature map from a previous convolution layer. The last convolution layer outputs a rotation invariant (RI) feature vector representing fingerprint features of the person in a rotation invariant manner, which is then used to authenticate the person.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3C is a flowchart of an exemplary process for a multilevel rotation invariant feature extraction model constructor, in accordance with an embodiment of the present teaching;

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

The present teaching discloses a solution for rotation invariant biometric feature extraction and recognition that address deficiencies observed in the biometric industry. Although the solutions described herein may be illustrated in the context of fingerprint recognition, the approaches and concepts may also be applied to other types of biometric information such as palm or face. Rotation invariant convolution kernels are applied at different levels of detail of the images so that features at different levels of detail may all be detected in a rotation invariant manner. At each level, rotation invariant convolution kernels are derived based on rotation covariant kernels in different rotating directions and the parameters of the rotation covariant kernels are learned via machine learning. The rotation invariant convolution kernels generated based on machine learned rotation covariant convolution kernels form feature extraction models and may then be used for extracting rotation invariant features from the input biometric information.

For rotation invariant recognition, the rotation invariant feature extraction models derived in accordance with the present teaching may be used as the starting point for further machine learning of rotation invariant recognition models for authentication based on training data. Such derived rotation invariant models enable not only feature extraction but also recognition to be carried out in a rotation invariant manner without the need to extract fine level features from the biometric information, which is sensitive to noise, environment, and the way the body part is place on an authentication device. Although the details presented herein may be provided based on fingerprint-based authentication, the concepts and solutions as described herein may also be used for feature extraction and recognition of other types of biometric information such as face or palm.

Figure 1A:
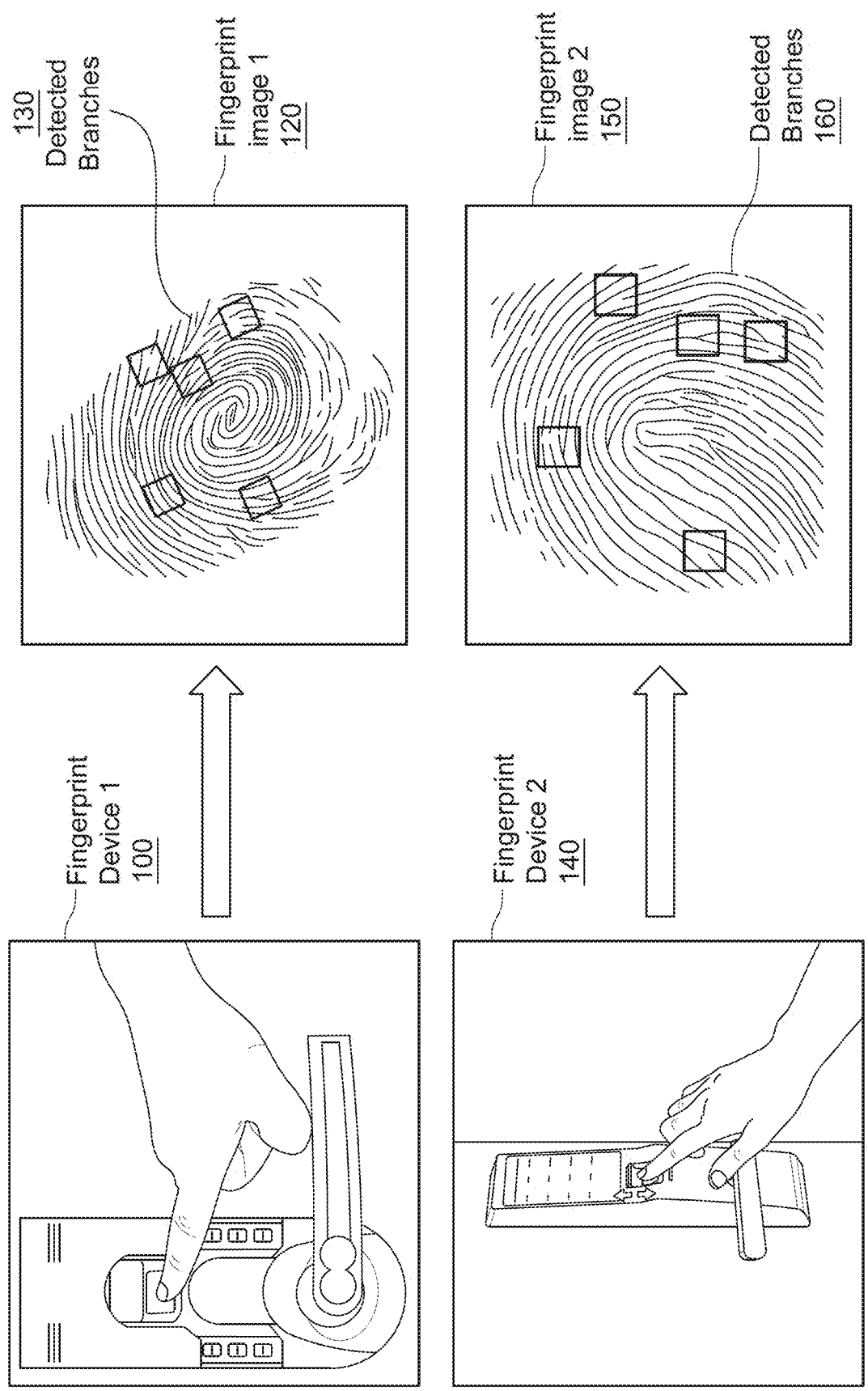
FIGS. 1A-1B illustrate issues with fingerprint recognition and prior art solutions thereof.
Figure 1B:
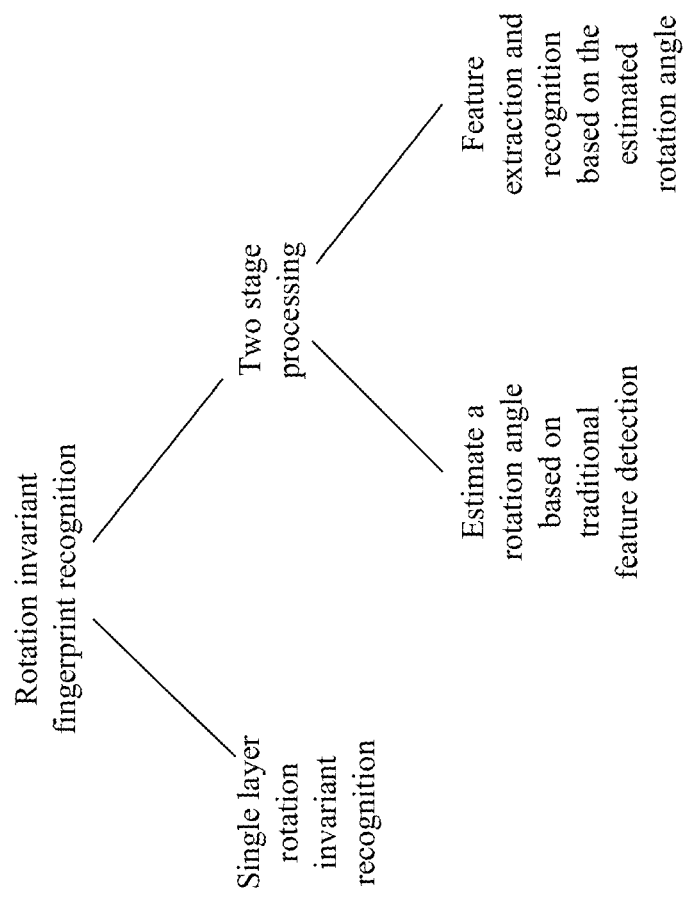
Figure 2A:
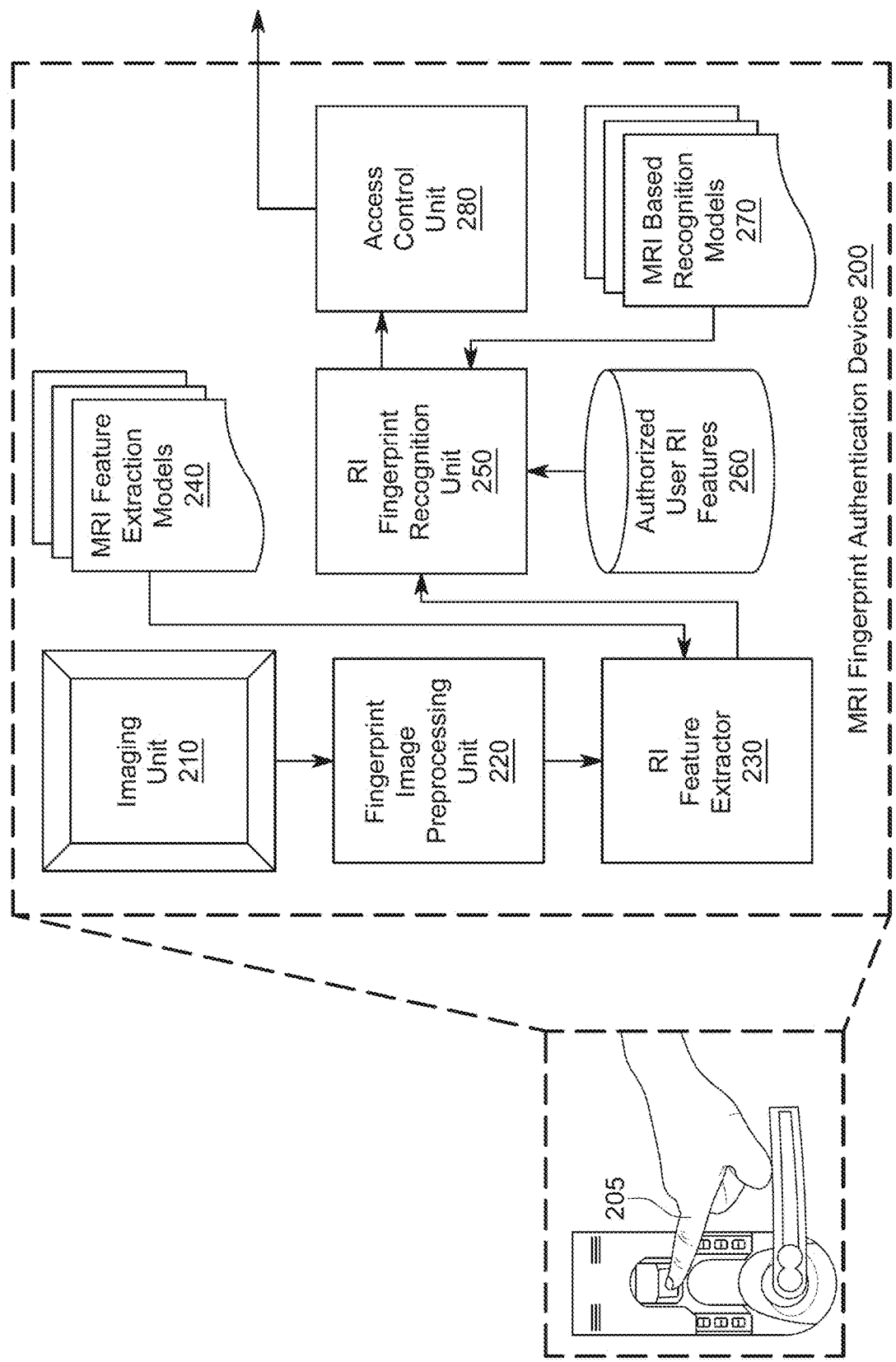
FIG. 2A depicts an exemplary high level system diagram of a multilevel rotation invariant fingerprint authentication device, in accordance with an embodiment of the present teaching.

FIG. 2A depicts an exemplary high level system diagram of a multilevel rotation invariant (MRI) fingerprint authentication device 200, in accordance with an embodiment of the present teaching. In this illustrated embodiment, a person places a finger 205 on the MRI fingerprint authentication device 200 and the person is being authenticated based on a fingerprint image acquired by the MRI fingerprint authentication device 200. Depending on the authentication result, the person is either verified as an authorized person or denied. The exemplary MRI fingerprint authentication device 200 comprises an imaging unit 210, a fingerprint image preprocessing unit 220, a rotation invariant (RI) feature extractor 230, a RI fingerprint recognition unit 250, and an access control unit 280. The imaging unit 210 is provided to acquire one or more images of a finger placed on the device (e.g., finger 205 placed on the device as shown in FIG. 2A). Such an acquire image is preprocessed by the fingerprint image preprocessor unit 220. Based on appropriately processed fingerprint image, the RI feature extractor 230 is deployed to extract rotation invariant features by convolution with the image at multiple resolution levels using RI kernels at each level or multilevel rotation invariant (MRI) feature extraction models 240. The RI fingerprint recognition unit 250 is provided to determine, based on MRI recognition models 270 trained using MRI features, whether the person corresponds to one of authorized users. In some embodiments, the RI fingerprint recognition unit 250 may be trained to recognize the identities of a group of authorized persons so that at the recognition time, it is to recognize, based on RI features, the identity of the person and if the recognized person is one of authorized users, the person is granted access. In some embodiments, the RI fingerprint recognition unit 250 is trained for verifying that the RI features detected from an image match with previously stored RI features associated with one of a group of authorized users. In this verification mode, what leads to the grant of access is that there is a match at the feature level without necessarily a decision as to the identity of the person. Depending on the authentication result, the access control unit 280 is provided to control the physical access mechanism. In this authentication process, no traditional fingerprint fine features (such as 130 and 160 shown in FIG. 1A) need to be detected and rotation invariant features are extracted at multiple resolution levels.

Figure 2B:
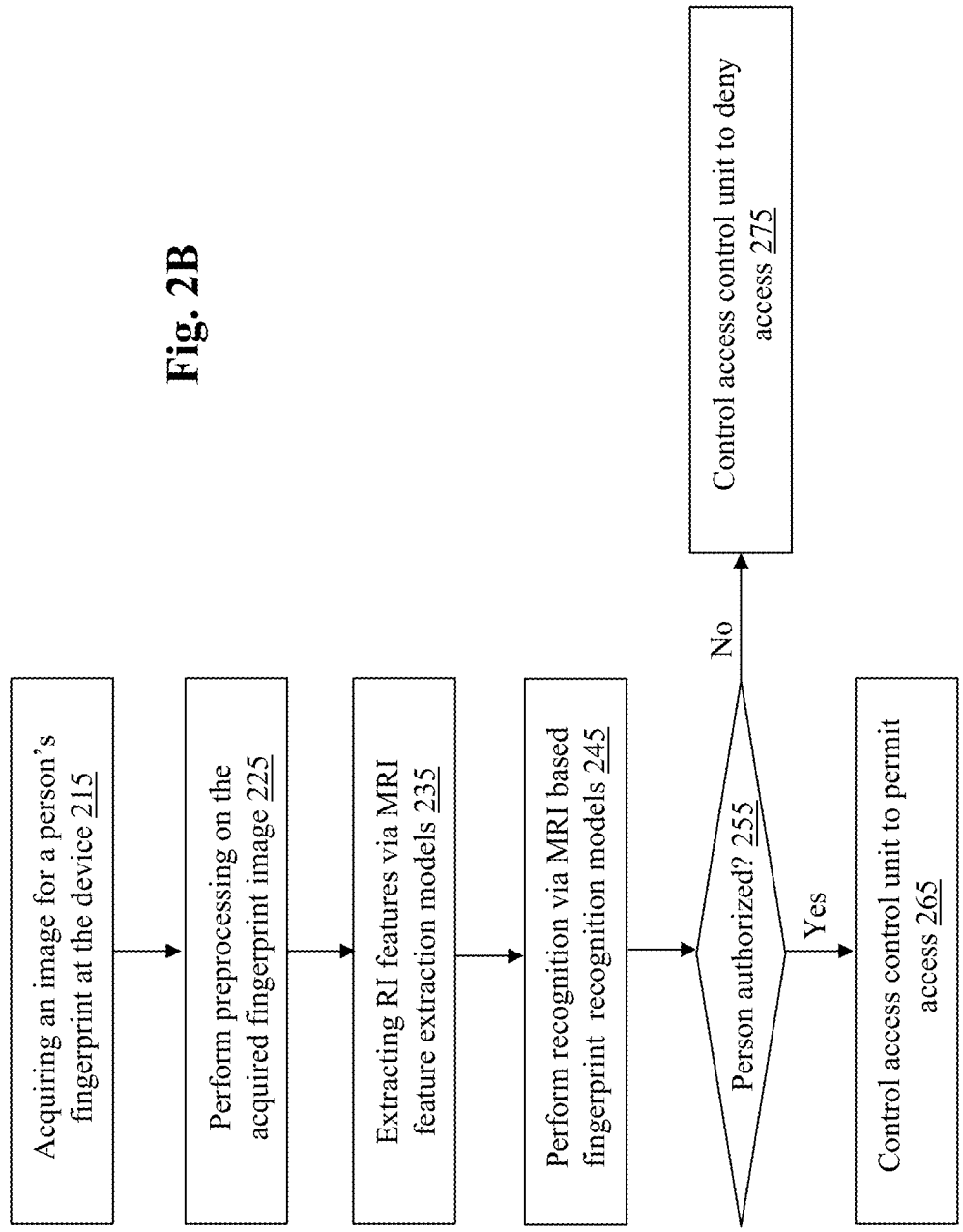
FIG. 2B is a flowchart of an exemplary process of a multilevel rotation invariant fingerprint authentication device, in accordance with an embodiment of the present teaching.

FIG. 2B is a flowchart of an exemplary process of the MRI fingerprint authentication device 200, in accordance with an embodiment of the present teaching. An image for a finger placed on the device is first acquires, at 215, by the imaging unit 210. The acquired image is then preprocessed, at 225, by the fingerprint image processing unit 220. Rotation invariant features of the image are extracted, at 235, by the RI feature extractor 230 based on the MRI feature extraction models 240. Using the RI features, the RI fingerprint recognition unit 250 performs, at 245, recognition or verification in accordance with the trained MRI based recognition models 270. If it is determined, at 255, that the person is one of the authorized users (via either recognition or verification), the person is granted access, at 265, by the access control unit 280. Otherwise, the access control unit 280 denies, at 275, the person's access.

In authenticating a user, the rotation invariance of the extracted features is ensured by the use of MRI feature extraction models 240, which are trained by machine learning. In some embodiments, feature extraction from an image can be performed via a convolutional neural network (CNN) and in this case, the MRI feature extraction models 240 correspond to kernels used for convolutions at different resolution levels for feature extraction. In such operations, what is learned during training via machine learning includes the weights of such kernels and the training criteria may be directed to obtaining weights that lead to rotation invariant feature extraction. When kernels with such learned weights are used to convolve with an input image, the features so extracted are rotation invariant.

Figure 3A:
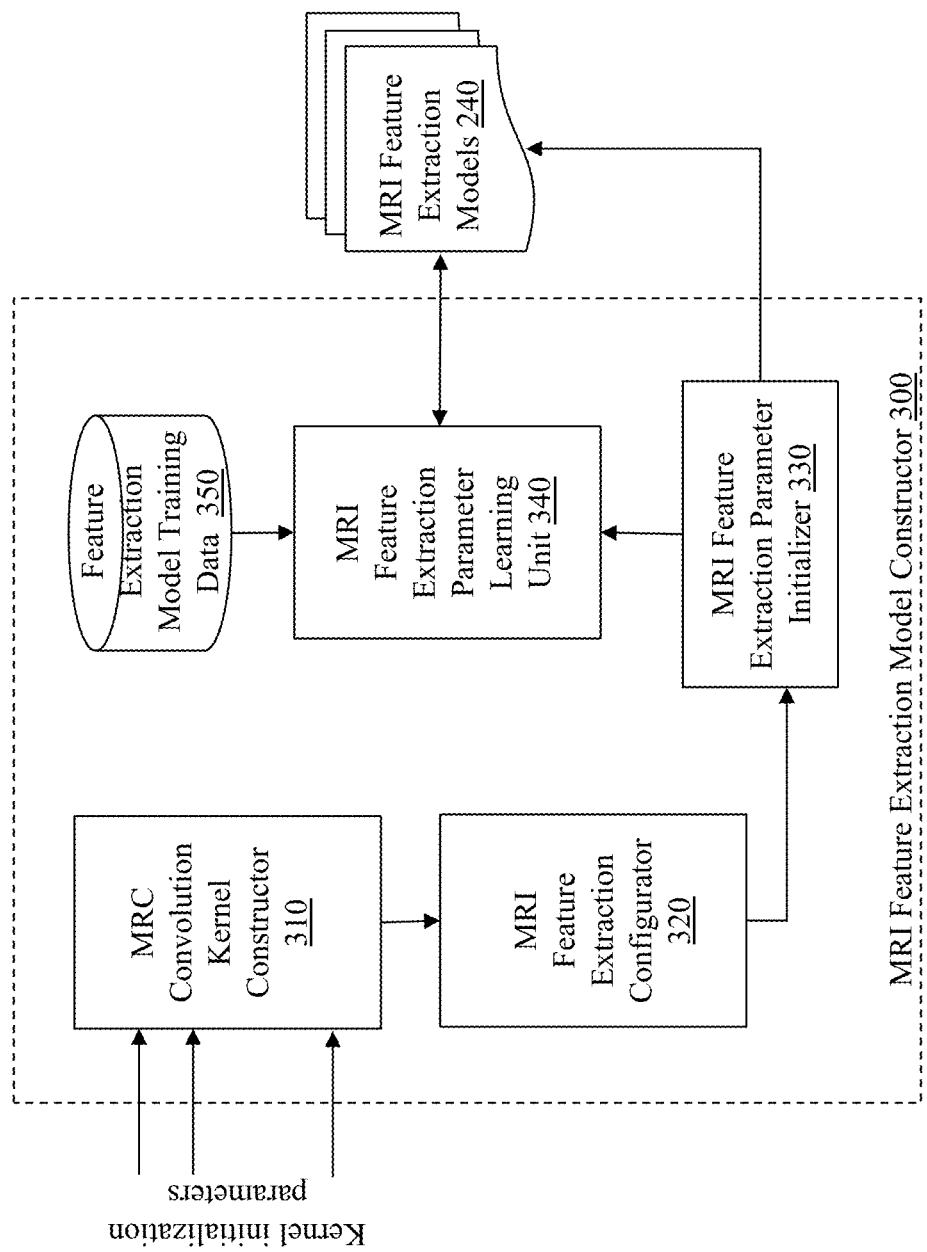
FIG. 3A depicts an exemplary high level system diagram of a multilevel rotation invariant feature extraction model constructor, in accordance with an embodiment of the present teaching.

FIG. 3A depicts an exemplary high level system diagram of an MRI feature extraction model constructor 300 for obtaining the MRI feature extraction models 240, in accordance with an embodiment of the present teaching. In this illustrated embodiment, invariant feature extraction may be implemented via a convolution neural network (CNN) with multiple layers, and the MRI feature extraction models may correspond to various convolution kernels with weights learned via learning to not only capture the unique features of each individual's fingerprints but also the identification of such features needs to be rotation invariant. According to the present teaching, the rotation invariant capability is achieved through the rotation covariance, i.e., the detected biometric features detected need to be sensitive to the rotation of the fingerprint in a consistent manner and then rotation invariance is accomplished because no matter how the fingerprint rotates, the unique features can always be extracted in any orientation.

In the illustrated embodiment shown in FIG. 3A, the MRI feature extraction model constructor 300 comprises a multilevel rotation covariant (MRC) convolution kernel constructor 310, a multilevel rotation invariant (MRI) feature extraction configurator 320, an MRI feature extraction parameter initializer 330, and an MRI feature extraction parameter learning unit 340. According to the present teaching, at each level of a CNN for MRI feature extraction, rotation invariance is obtained based on convolution using rotation covariant kernels and the post processing of the convolution results (rotation covariant) is performed to identify rotation invariant features. The MRC convolution kernel constructor 310 provides the constructs of the RC convolution kernels. The MRI feature extraction configurator 320 provides parameters needed for extracting rotation invariant features from rotation covariant convolution results. The weights associated with the rotation covariant kernels and the parameters for identifying rotation invariant features from convolution results constitute the MRI feature extraction parameters, which define the MRI feature extraction models 240.

Figure 3B:
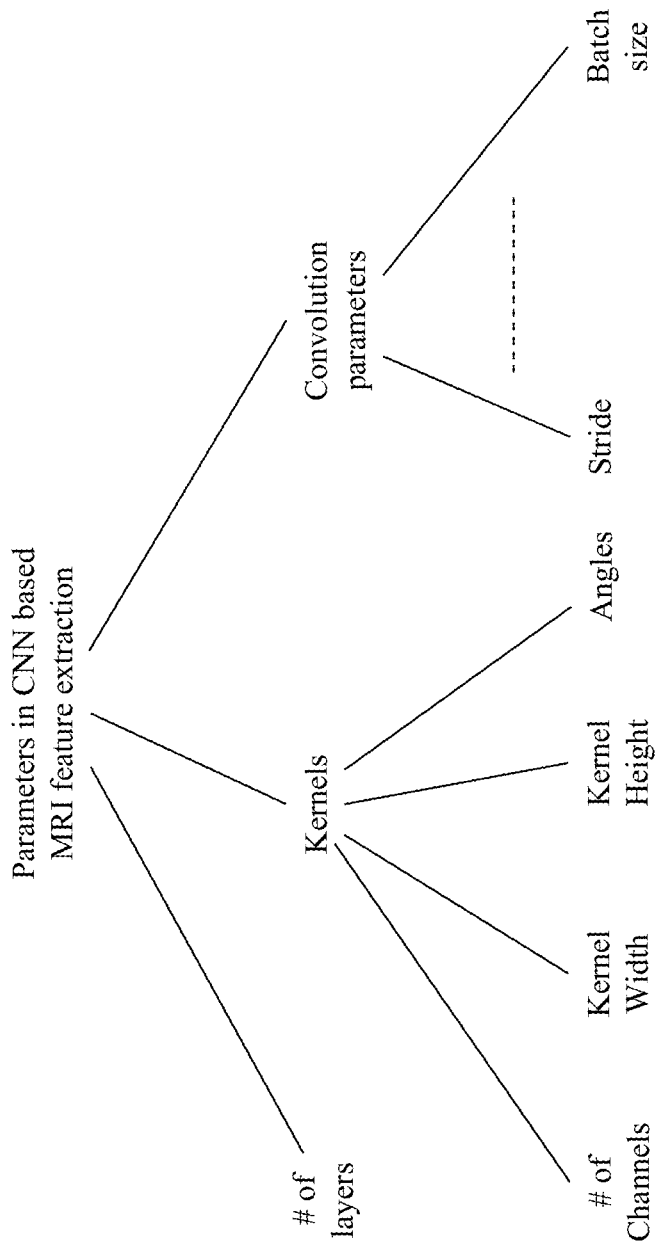
FIG. 3B illustrates exemplary types of parameters associated with multilevel rotation invariant feature extraction using CNN, in accordance with an embodiment of the present teaching.

There may be other operational parameters in operating a CNN for M feature extraction. FIG. 3B illustrates exemplary types of parameters associated with multilevel rotation invariant feature extraction using CNN, in accordance with an embodiment of the present teaching. As shown, in addition to values of weights associated with kernels used for convolutions, parameters related to the CNN's layers, structural information related to the weight and bias kernels (number of channels, width and height of the kernel), the angles of rotation of the kernels to achieve rotation covariance, . . . , as well as other operational parameters during convolution such as batch size used, . . . , and stride used for each convolution. FIG. 3C is a flowchart of an exemplary process for the MRI feature extraction model constructor 300, in accordance with an embodiment of the present teaching. First, the multilevel rotation covariant (RC) convolution kernel constructs may be determined, at 305, by the MRC convolution kernel constructor 310. Such constructs may be defined based on the dimension of the RC kernels at each layer of the CNN. For instance, such RC kernels may be 3×3×3, i.e., 3 channels with width and height bring 3 as well. To be rotation covariant, it may also be determined how to make such kernels rotation covariant, e.g., each kernel may be rotated to a set of predetermined angles so that the rotated versions may be responsive to an image which has a fingerprint image with a different orientation. Such a set of kernels constitutes RC covariant kernels because when they are convolved with an image, the convolution results can capture features in the image in different orientations. The features to be captured through these kernels depend on the weights in the kernels. Such weights are subject to learning, which will be disclosed below.

Operations used to identify rotation invariant features from RC convolution results (which are rotation covariant) may be configured, at 315, by the MRI feature extraction configurator 320. For instance, after the RC kernels are used to convolve with an image, it produces multiple results each of which may represent responses to a kernel of different orientation. To detect rotation invariant features, the maximum response at each pixel location across a set of convolution results may be selected to yield a rotation invariant result. In this case, operations to be performed to identify RI features may be configured or specified with respect to different RC convolution results with certain parameters. Different configurations may be used in learning to see what works the best. For each configuration, during the machine learning, the weights of RC kernels are learned via training based on training data.

As discussed herein, the values of weights of different kernels are learned via training. To prepare for the training, the weights of different kernels at different layers are initialized, at 325, by the MRI feature extraction parameter initializer 330. The learning is conducted based on the initialized weight values by the MRI feature extraction parameter learning unit 340 based on training data from storage 350, which provides the input images with fingerprint features extracted therefrom as ground truth. In this training process, the weight values of different MRC kernels are adjusted in an iterative manner based on some loss function defined based on the discrepancy between RI features extracted via convolution using MRC kernels and the ground truth feature values. During each iteration, a convergence condition is examined at 345. If there is convergence, the MRI feature extraction models are generated, at 365, based on the learned weights of different MRC kernels. If it is not yet converged, the learning process continues, at 355, based on the next training data from storage 350.

Figure 4A:
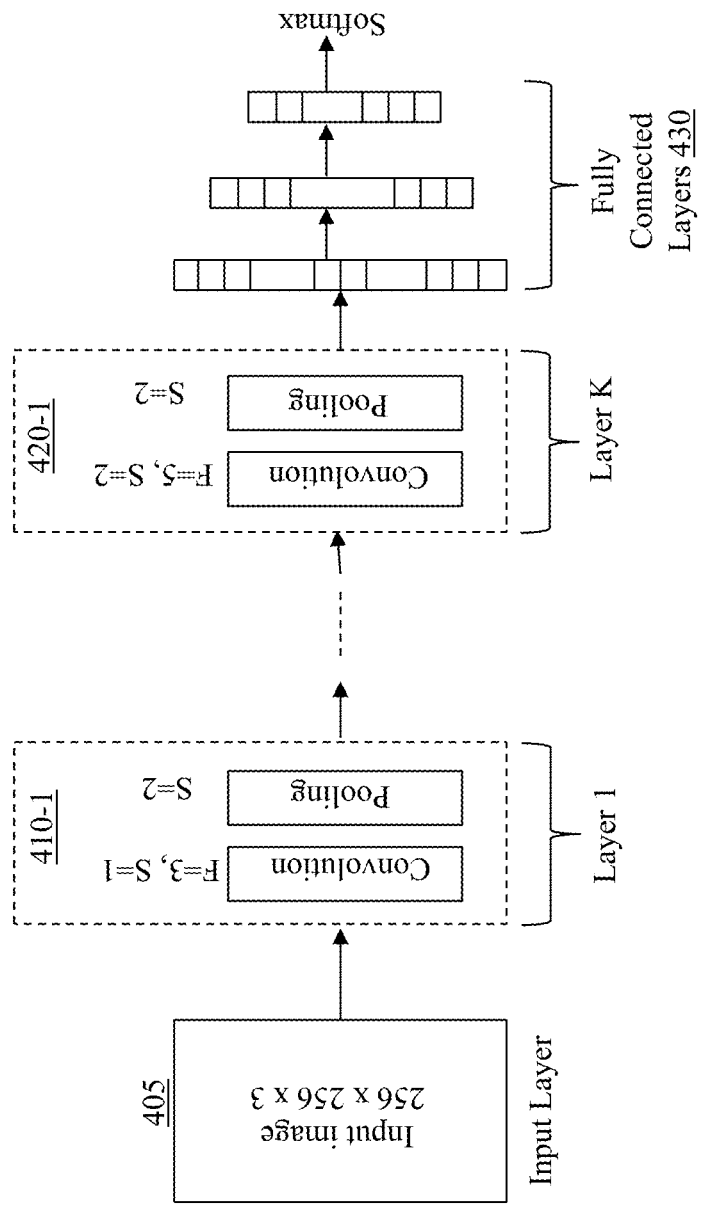
FIG. 4A depicts a typical CNN architecture.

FIG. 4A depicts a typical CNN architecture 400-1. As discussed herein, in some embodiments, the present teaching is implemented based on CNN. As shown, a CNN has multiple layers, including an input layer 405, multiple middle layers, i.e., layer 1 410-1, . . . , layer K 420-1, and one or more fully connected layers 430. Each of the middle layers may be a convolution layer with, e.g., both convolution and max pooling sub-layers. The middle layers may be viewed as feature extraction layers and followed by the fully connected layers 430 for, e.g., classification or recognition related tasks. Through this architecture, an input image with dimension, e.g., 256×256×3 (image size 256×256 with each pixel with 3 color RGB channels) is input to layer 1 410-1, where both convolution and max pooling are performed. For instance, in this example, the convolution at layer 1 410-1 is performed using, e.g., a kernel of size 3×3 (F=3) with convolution parameter stride=1 (S=1), and the max pooling is performed using stride 2 (S=2), yielding processing result corresponding to a matrix of a dimension smaller than the input image. The max pooling of stride 2 effectively reduces the dimension by half. The output of layer 1 410-1 is forwarded to layer 2, where another kernel for that layer is used to convolve with the output from layer 1 and max pooling may also be performed at layer 2, further reducing the dimension. The convolution plus max pooling at each layer continues through the last layer K 420-1. In this illustration, the convolution parameters for layer K include kernel size 5×5 and stride 2. The max pooling at layer K 420-1 adopts also stride 2. The output of layer K may correspond to a feature vector obtained for input image 405 (e.g., a 512-dimensional feature vector) and may then be used for classification by the fully connected layers 430.

Figure 4B:
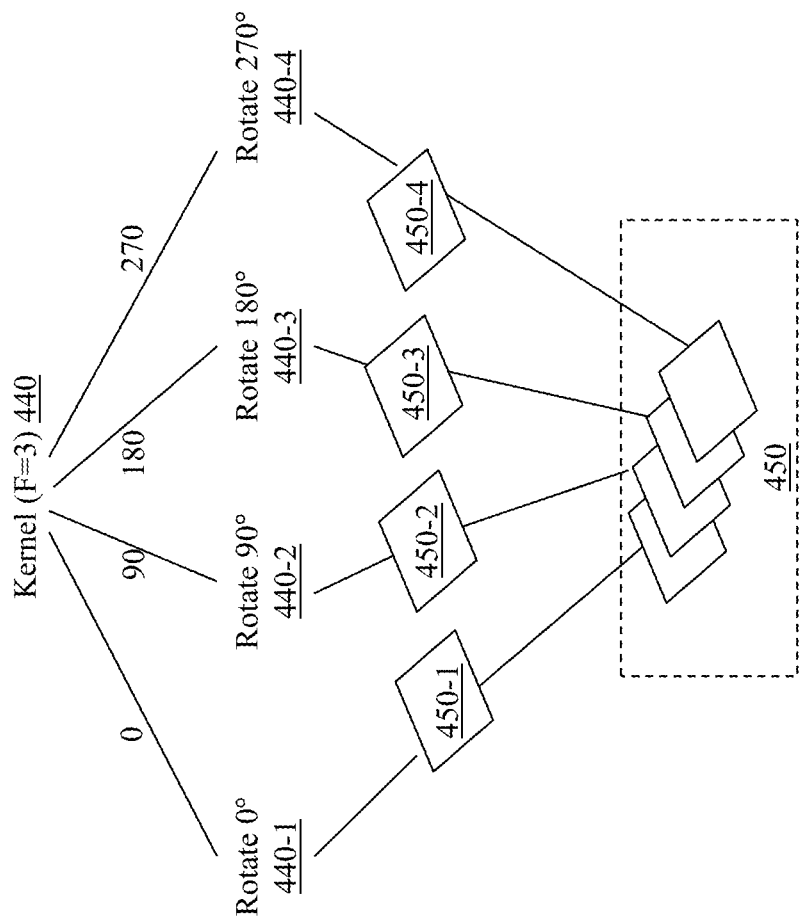
FIG. 4B show exemplary rotation covariant convolution kernels, in accordance with an embodiment of the present teaching.

To use a CNN to detect features in a rotation invariant manner, rotation covariant kernels are used to convolve with an input image to produce response convolution results that are responsive to features of different orientations. FIG. 4B show exemplary rotation covariant convolution kernels, in accordance with an embodiment of the present teaching. For a convolution kernel 440 of a certain dimension, say 3×3, with weight values therein, a plurality of, say N, variant kernels may be generated by rotating kernel 440. As discussed herein, the angles used to rotate kernel 440 to generate the plurality of (N) variant kernels are operation parameters. In some embodiments, the number of angles used to rotate kernel 440, e.g., rotate 0 degrees, 90 degrees, 180 degrees, and 270 degrees to produce 4 (N=4) variant kernels 450-1, 450-2, 450-3, and 450-4, respectively, as shown in FIG. 4B. If assume that these kernels have only a single channel, i.e., C=1, then the variant kernels also have a dimension of (W, H), where W and H are width and height of the kernel 440. In the example in FIG. 4B, W=H=3. In some embodiments, the variant kernels with different orientations may be concatenated in one dimension to generate or reshape into a concatenated kernel 450. When C=1, the concatenated kernel 450 corresponds to (4, W, H), as shown in FIG. 4B.

Figure 4C:
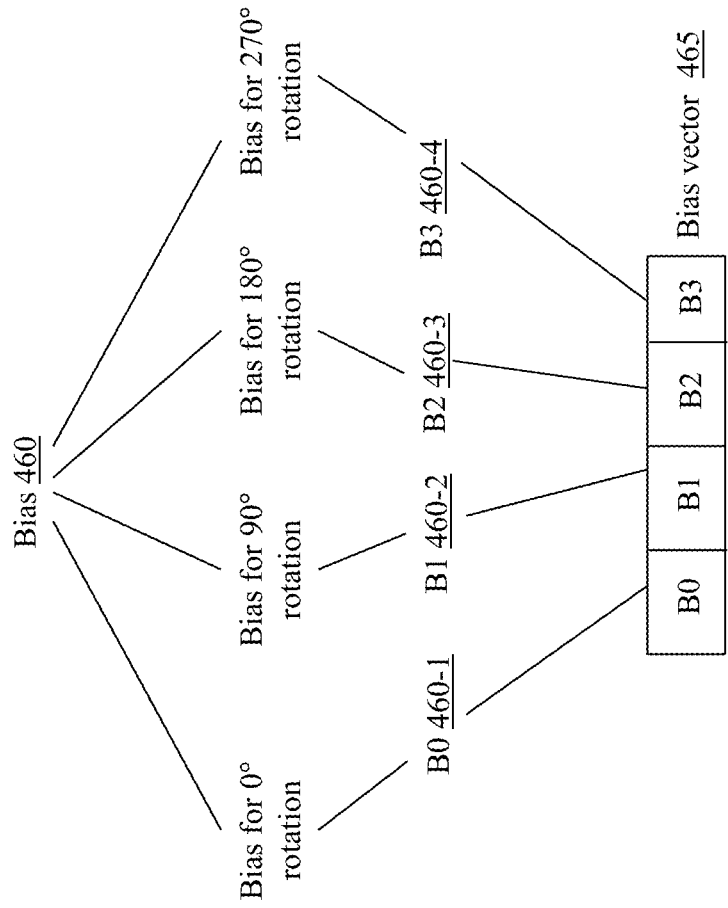
FIG. 4C show an exemplary rotation covariant bias kernel, in accordance with an embodiment of the present teaching.
Figure 4D:
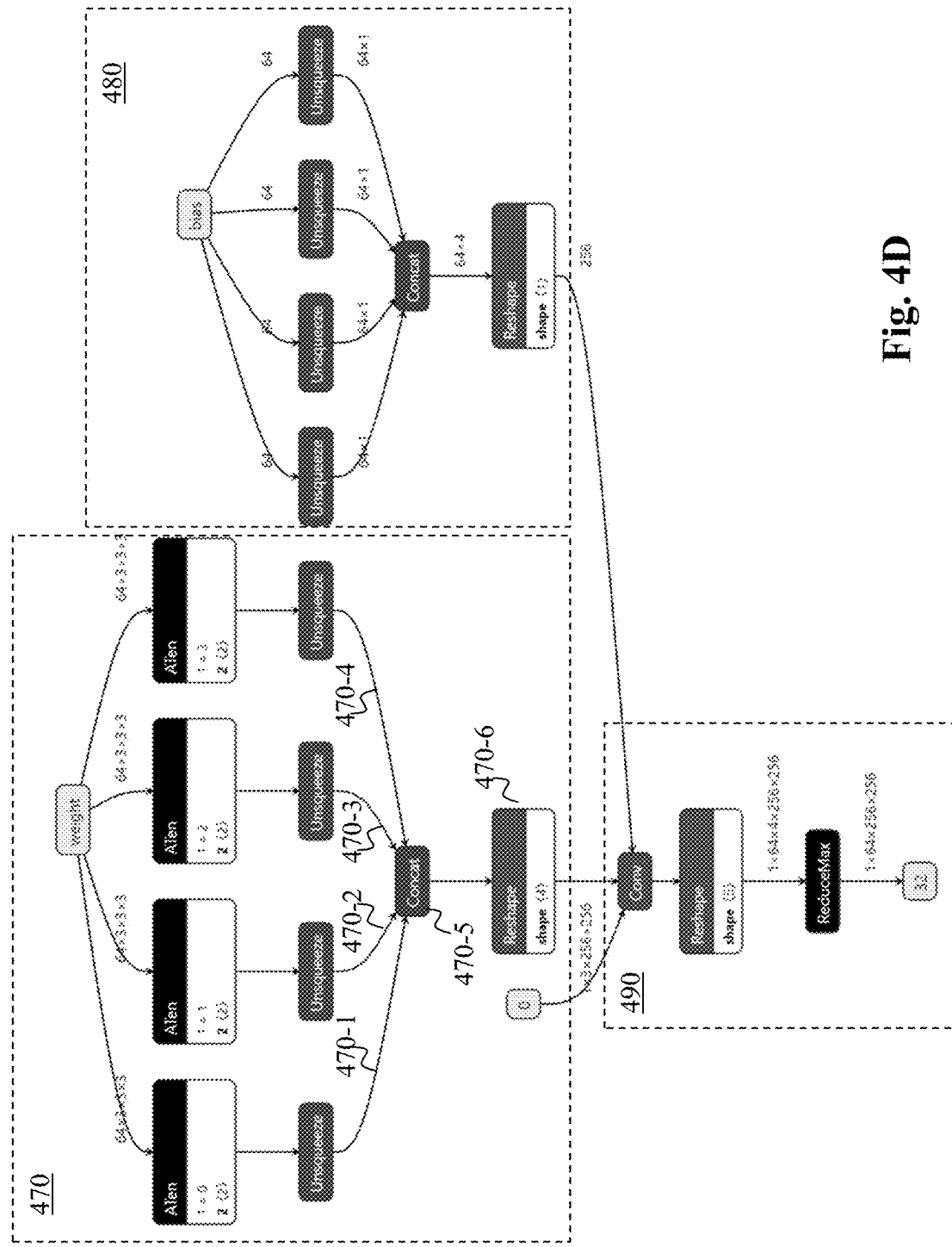
FIG. 4D depicts an exemplary generation of a rotation covariant kernel and a bias vector and their usage at a convolution layer, in accordance with an embodiment of the present teaching.

As discussed herein, the convolution at each layer of CNN may also use a bias. It is generally the practice that the output of a convolution using a convolution kernel is a weighted sum plus a bias, i.e., a convolution result is a linear combination of weighted pixel values (weighed by the respective weights of the kernel) and a bias. As such, for each of the variant kernel generated based on kernel 440, there is a bias associated therewith. FIG. 4C show exemplary biases for respective rotation covariant kernels, in accordance with an embodiment of the present teaching. For each of the N=4 variant kernels 450-1, 450-2, 450-3, and 450-4 (generated based on kernel 440 to achieve rotation covariance), corresponding biases B0 460-1, B1 460-2, B2 460-3, and B3 460-4, are generated, respectively, based on a bias 460 for kernel 440. When variant kernels 450-1, 450-2, 450-3, and 450-4 are concatenated to form the rotation covariant kernel 450, their corresponding biases B0, B1, B2, and B3 are also concatenated to form a 4×1 vector 465 as shown in FIG. 4C. FIG. 4D visualizes the process of generating a rotation covariant kernel and a corresponding bias vector and their use at a convolutional layer, in accordance with an embodiment of the present teaching. This illustrated example is provided with batch size B=64 (i.e., 64 images are processed as a batch), number of channels=3, and the width and height of the kernel in each channel is 3×3. Given that, the initial kernel is 64×3×3×3 and each of the four variant kernels generated based on the weights of the initial kernel is thus also dimensioned at 64×3×3×3. As shown, in 470, the weights of an original kernel 440 are rotated according to predetermined angles to derive the weights of 4 variant kernels 470-1, 470-2, 470-3, and 470-4. The 4 variant kernels are then concatenated at 470-5 and reshaped at 470-6 to derive the rotation covariant kernel 450. In 480, the bias of kernel 440 are used to derive corresponding 4 biases for the 4 variant kernels 470-1, 470-2, 470-3, and 470-4. These 4 biases are then concatenated and reshaped to derive the bias vector. Such generated rotation covariant kernels and biases are then used in carrying out the convolutions, which is explained below.

Figure 4E:
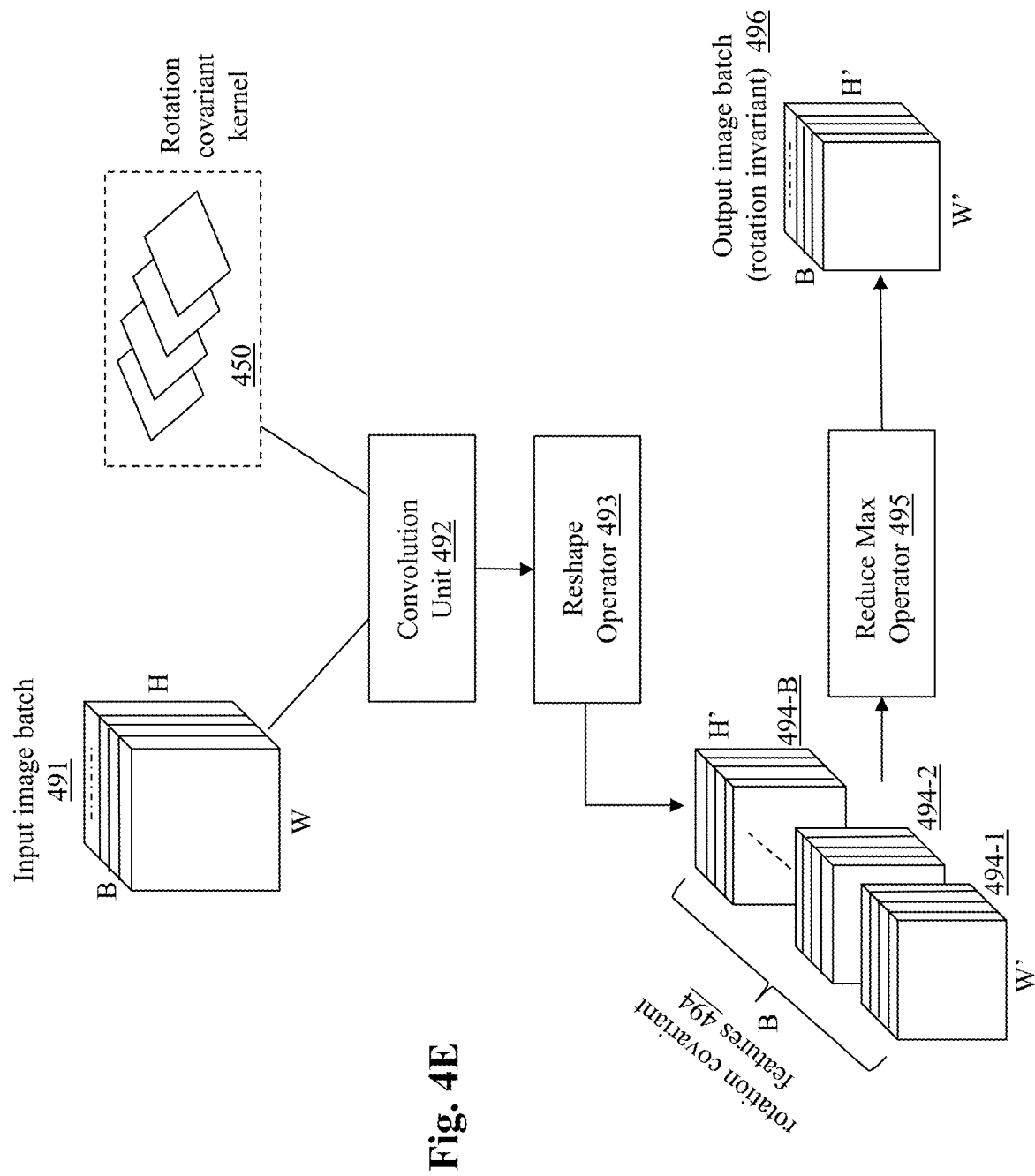
FIG. 4E depicts visually the operation of deriving rotation invariant features from convolution results using rotation covariant kernels, in accordance with an embodiment of the present teaching.

FIG. 4E shows exemplary operation of deriving rotation invariant features from convolution results using rotation covariant kernels, in accordance with an embodiment of the present teaching. To simplify the discussion, this example is provided with the number of channels=1. In this exemplary illustration, the input volume 491 is a batch of biometric images with dimension (B, W, H), where B is the batch size, W and H represent the width and height of each image (with C=1). As discussed herein, the rotation covariant kernel 450 is generated by concatenating 4 rotated kernels (generated by rotating the original kernel 0, 90, 180, and 270 degrees, respectively) and each of the rotated kernel has a certain dimension, say 3×3. Thus, the rotation covariant kernel 450 has a dimension (4, 3, 3).

Given the input image batch 491, the convolution unit 492 convolves the rotation covariant kernel 450 with each of the input image in the batch. The output convolution result has a dimension of (B, C*4, W', H'), where C is the number of channels in the input image and W'×H' is the dimension of the convolution result. When C=1, the convolution result has a dimension of (B, 4, W', H'). W' and H' generally are smaller than W and H. For instance, if stride=1, W'=W−2, H'=H−2. When C>1, the reshape operator 493 takes the convolution result with dimension (B, C*4, W', H') and reshape it into (B, C, 4, W', H'). This is shown as 494, where there are B volumes, each of which has a convolution result as a volume, i.e., 494-1 for a first input image in batch B, 494-2 for a second input image in batch B, . . . , 494-B for Bth input image in the batch. When C=1, each convolution result volume, say, 494-1, is reshaped into 4 convolution results, each corresponding to, respectively, the convolution result yielded by convolving one of the rotated or variant kernels in rotation covariant kernel 450 (i.e., corresponding to rotation angles 0, 90, 180, and 270) with the first input image.

In this way, each of the 4 convolution results in 494-1 contains responses to the kernel content contained in one of the rotated kernels with respect to a certain direction (angle). Thus, if the input image is rotated, the captured features change accordingly in some of the convolution result(s), and together, the captured features are rotation covariant, i.e., it changes with the change of rotation of the fingerprint image. To capture rotation invariant features, the present teaching performs, e.g., a reduce max operation by the reduce max operator 495, to obtain output image batch 496 with rotation invariant features captured therein. The reduce max operation is performed as follows. At each pixel of the output feature map, its pixel value is the maximum value of the four pixel values at the same pixel location of the 4 convolution results. That is, the rotation invariant convolution result for the input image, say 494-1, has, at each pixel, the maximum convolution response from the four convolution results using variant kernels. This yields a rotation invariant feature map with dimension (1, 1, W', H'), representing rotation invariant features extracted at this level of the CNN.

In this illustrated example, 4 angles are used to rotate a kernel to generate the rotation covariant kernel 450, it is merely for illustration instead of for limitation. More angles may be used. For instance, to be more sensitive to more slight rotations of a fingerprint, a smaller increment of rotation angles, e.g., every 45°, may be used at 0, 45, 90, 135, 180, 225, 270, and 315 to generate 8 (N=8) rotated kernels to form the rotation covariant kernel 450. Each of the convolution layers in the CNN may adopt this rotation invariant feature detection scheme so that rotation invariant features can be extracted at each level of the CNN network.

Figure 4F:
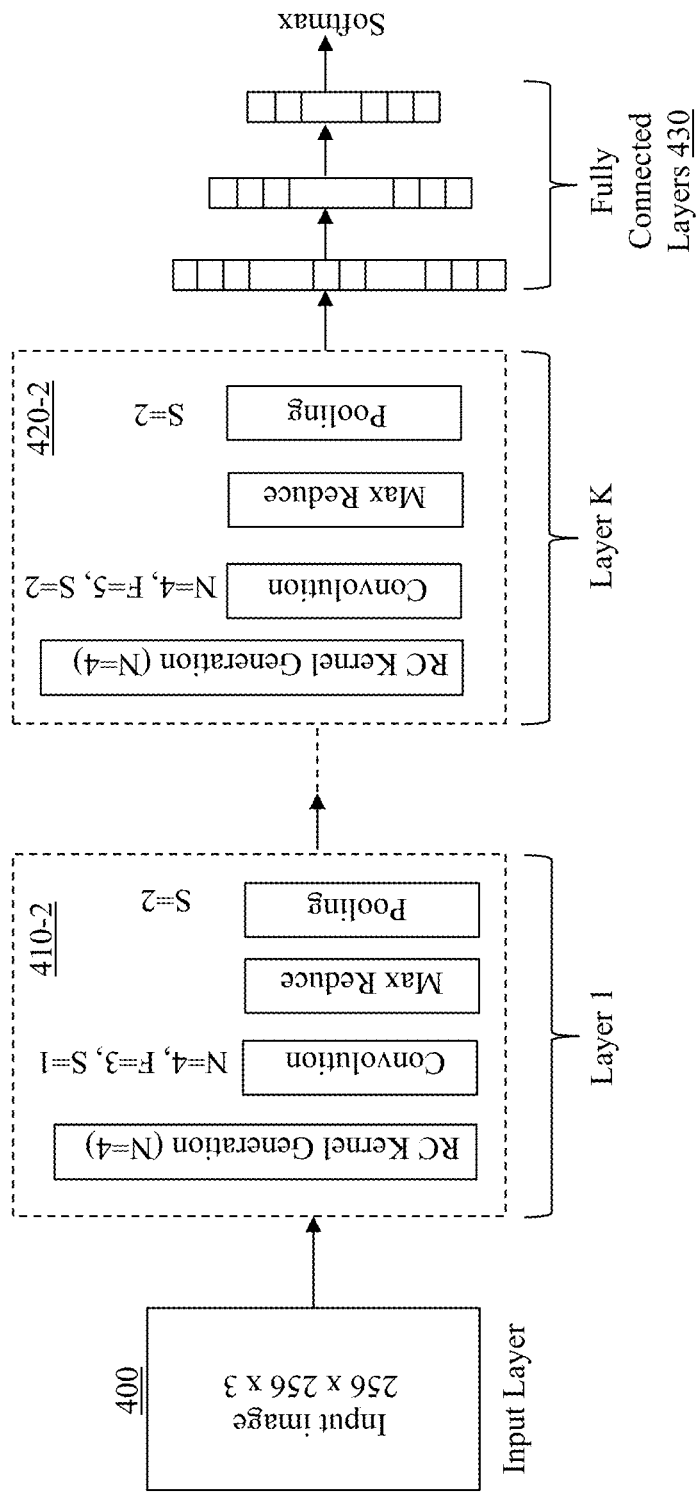
FIG. 4F depicts a CNN architecture capable of detecting rotation invariant features from an input image, in accordance with an embodiment of the present teaching.

FIG. 4F depicts a CNN architecture 400-2 capable of detecting rotation invariant features at different levels from an input image, in accordance with an embodiment of the present teaching. Compared with the CNN architecture 400-1 shown in FIG. 4A, the CNN architecture 400-2 adds, to each layer, additional operations, including (1) generating rotation covariant kernel by expanding the convolution at that layer with respect to a range of directions in order to be rotation covariant and (2) max reduce operation to determine at each layer the maximum response at each pixel so that no matter how the input image is rotated because of the placement of a fingerprint, the features responsive to a certain rotation can be identified. In this architecture, at every layer of the CNN, features at that layer may be detected in a rotation invariant manner, as discussed herein.

Figure 4G:
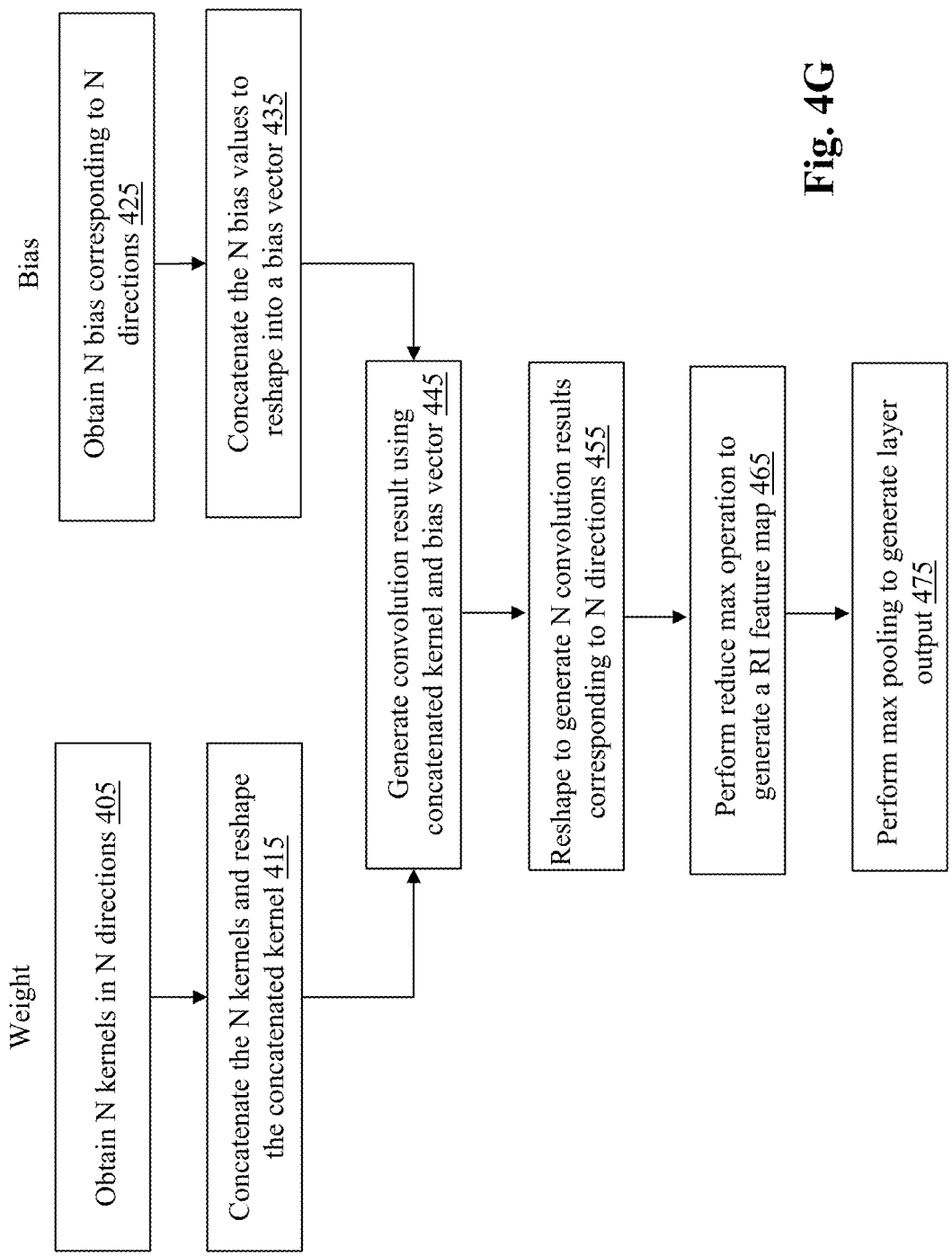
FIG. 4G is a flowchart of an exemplary process for obtaining rotation invariant features based on convolution results using rotation covariant kernels, in accordance with an embodiment of the present teaching.

FIG. 4G is a flowchart of an exemplary process for obtaining rotation invariant features at each layer based on convolution results using rotation covariant kernels, in accordance with an embodiment of the present teaching. At each layer of the CNN process, an initial kernel (e.g., 440) of dimension F×F is used to generate, at 405, N kernels by rotating the initial kernel in N predetermined directions. Such obtained N kernels are concatenated and then reshaped, at 415, to derive a rotation covariant kernel of dimension N×F×F for convolution. For bias, an original bias is based on to generate, at 425, N corresponding biases which are concatenated, at 435, to form a 1×N bias vector. The rotation covariant kernel and the bias vector are then used to convolve with an input image (which can be the intermediate feature image) of the layer to obtain the convolution result. The convolution result, which is a volume, is then reshaped, at 455, to generate N convolution results, each of which is convolution response corresponding to one of the variant kernels with a certain orientation. The N convolution results may then be processed via reduce max operation at 465 to obtain a rotation invariant feature map (image) of the layer. Based on the rotation invariant feature map after the reduce max operation, max pooling operation may then be performed, at 475, to generate an output rotation invariant feature map of the layer.

Figure 5A:
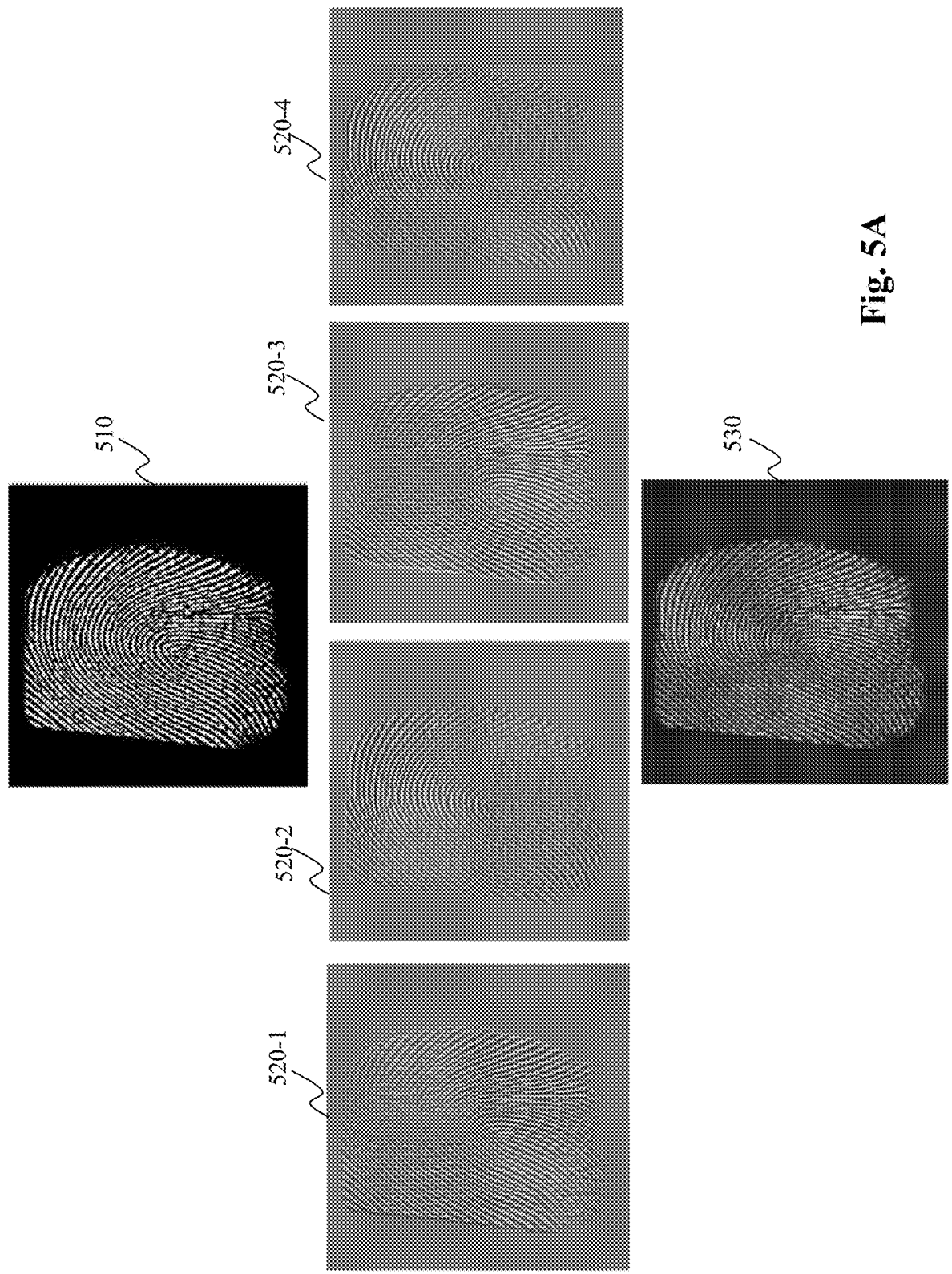
FIG. 5A shows exemplary rotation covariant features extracted from a fingerprint image based on convolution results using rotation covariant kernels, in accordance with an embodiment of the present teaching.

FIG. 5A shows an example of applying rotation invariant feature extraction from a fingerprint image, in accordance with an embodiment of the present teaching. In this illustrated example, 510 represents a feature image obtained based on a fingerprint image having a certain dimension with 3 channels (e.g., RGB). Assume that initially a convolution is performed using, e.g., a 3×3 kernel to convert into a feature image of a single channel (gray scale), as shown in 510. Using variant kernels obtained by rotating the original kernel by 0°, 90°, 180°, and 270° to convolve with the feature image 510, 520 represents reshaped convolution results 520-1, 520-2, 520-3, and 520-4, corresponding to kernels with 0°, 90°, 180°, and 270° rotations. As can be seen, each of the reshaped convolution results responds to features aligning with a certain direction or orientation. Image 530 represents the rotation invariant feature map, obtained via reduce max operation, i.e., each pixel in 530 is a maximum value of the four values at the same pixel location in 520-1, 520-2, 520-3, and 520-4.

Figure 5B:
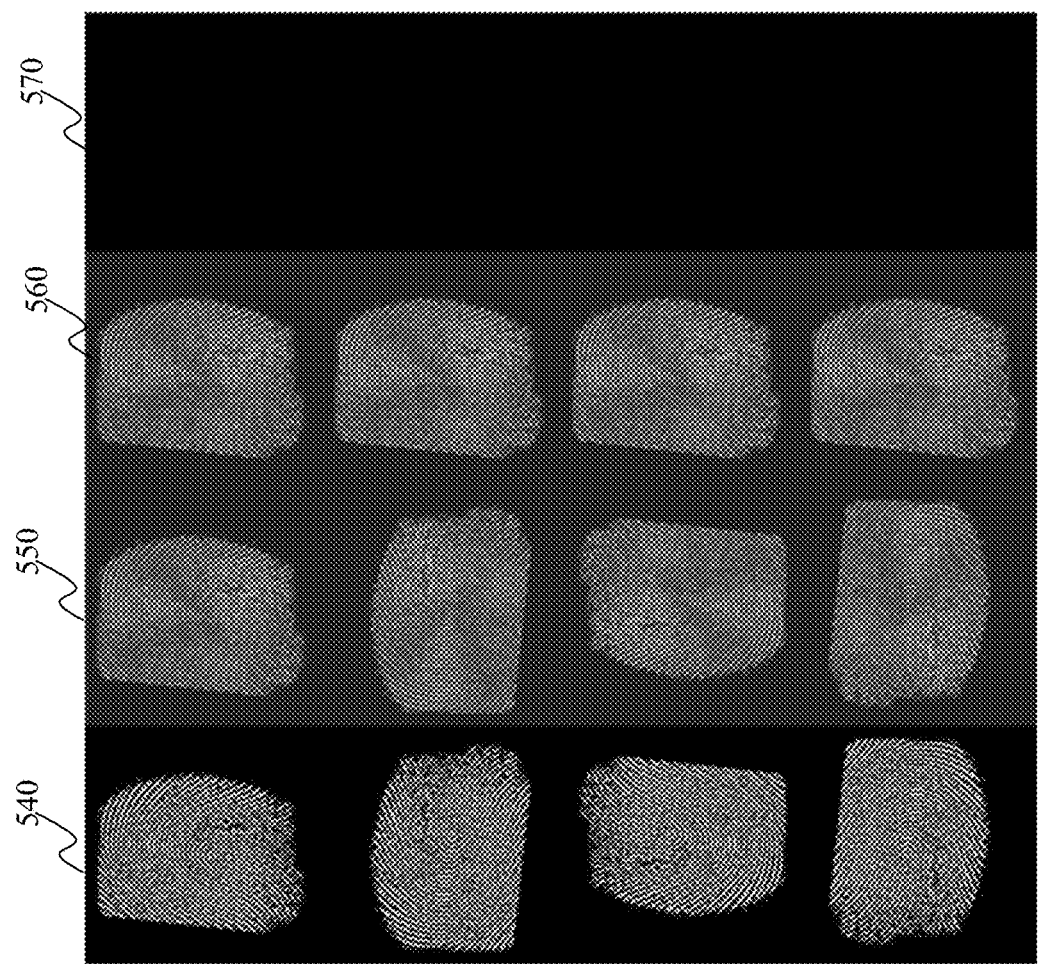
FIG. 5B illustrates the covariant characteristics of rotation covariant kernels, in accordance with an embodiment of the present teaching.

FIG. 5B illustrates some experimental results demonstrating the covariant characteristics of rotation covariant kernels, in accordance with an embodiment of the present teaching. Column 540 shows 4 gray scale feature images (obtained as discussed above), with the first image on top corresponding to the original feature image without any rotation (or 0° rotation) and the remaining three images below corresponding to ones obtained by rotating the top image by 90°, 180°, and 270°, respectively, in the counter clock direction. Given that, the images in column 540 represent images with the same content but with different orientations. Applying rotation covariant convolutions (as discussed herein) with the four images in column 540, 4 output images after the rotation covariant convolution are provided in column 550. To demonstrate rotation covariance, the output images in column 550 are first rotated to align with the direction of the top image in column 550 and they are shown in column 560. When comparing the top image in column 560 with each of the images in column 560, the differences in pixel values are shown in column 570. As seen, the differences between the second top, third top, and the last image in column 560 and the top image in the same column are respectively almost all zero, i.e., when an input image is rotated, the result of convolution using the rotation covariant kernels indicates that the detected features from images are also rotated accordingly and, thus, rotation covariant.

Figure 5C:
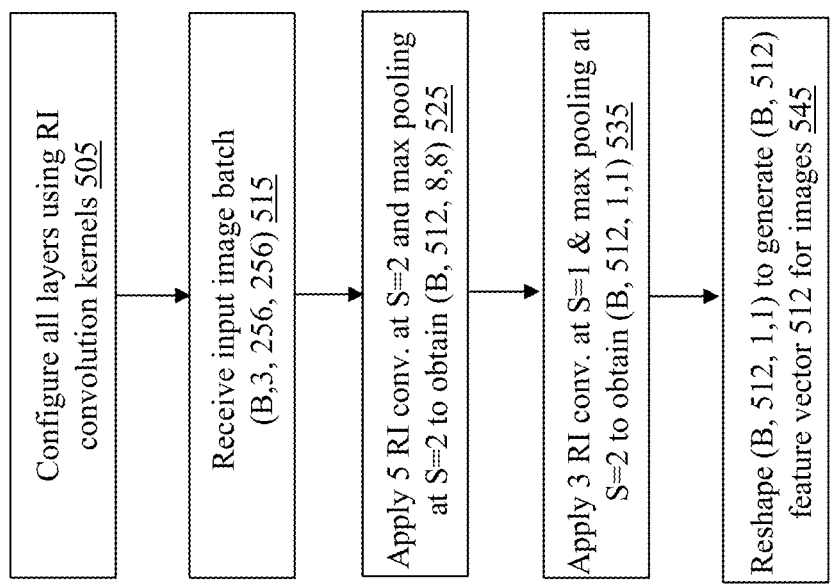
FIG. 5C is a flowchart of an exemplary process for a CNN to obtain rotation invariant features, in accordance with an embodiment of the present teaching.

FIG. 5C is a flowchart of a process for an exemplary CNN operation to obtain rotation invariant features, in accordance with an embodiment of the present teaching. The process is illustrated with respect to a batch of input images. At 505, the layers of the CNN are configured with kernels needed for RI feature extraction. The kernels are obtained based on RC convolution kernels in accordance with what is disclosed herein in accordance with the present teaching. An input image batch with B images is received at 515. In this example, each of the input images in the batch has an image size of 256×256 and 3 channels (e.g., RGB). In this illustrative CNN with rotation invariant feature extraction, first five (5) layers are provided for applying a convolution plus max pooling at each layer, where convolution at each layer uses a rotation covariant kernel of a certain size, e.g., 3×3 (with some padding such as pad=1) as well as the reduce max operation as described herein to obtain a rotation invariant feature map, which is then max pooled to generate the output of that layer as the input to the next layer. In this example, the convolution at each layer uses stride S=2 in both convolution and in max pooling operation. After applying 5 convolutions plus max pooling, at 525, the output has a dimension of (B, 512, 8, 8).

After the five layers of convolution and max pooling operations, the example CNN provides another 3 layers, each of which applies, at 535, a convolution using rotation covariant kernel of a certain size, e.g., 3×3 and pad=1, with stride S=1 as well as max pooling with stride S=2, to obtain an output with a dimension of (B, 512, 1, 1), which is then reshaped, at 545, to generate an output of size (B, 512), i.e., for each of the B input image, a feature vector (1, 512) is derived. Such generated feature vectors for B input images are rotation invariant because of the use of rotation covariant kernels as well as the reduce max operations at all the layers. As mentioned previously, a feature map generated for each input image at each layer of the CNN framework constructed in accordance with the present teaching is rotation invariant. Because of rotation invariant features can be detected at multiple levels of resolution, the final feature vector produced by the CNN network can be reliably extracted no matter what orientation of the fingerprint.

As discussed herein, as rotation invariant features can be extracted reliably because of the use of rotation covariant kernels used for convolutions, together with the biases used. The weights in each of the rotation covariant kernels as well as their corresponding biases are parameters to be learned via machine learning. During training, the weights and biases associated with different rotation covariant kernels may be initialized with some selected values and such initial values are adjusted during training based on ground truth provided with the training data. Such initialization is performed by the MRI feature extraction parameter initializer 330 (see FIG. 3A). Examples of initial weights of rotation covariant kernels include randomly generated values and/or the values yielded by a longitude differential filter. Based on the initialized weight and bias values, the MRI convolution kernel parameter learning unit 340 conducts a training process to learn the weights and biases associated with the rotation covariant kernels at all layers based on training data stored in storage 350. During learning, current weights and biases stored in 240 as the current MRI feature extraction models may be used to extract rotation invariant features from training images. To facilitate learning, the ground truth features for the training images are accessed from 350. The parameter values (weights and biases) of the current models are then updated or adjusted by minimizing a loss function, computed based on the differences between the extracted feature values and the ground truth feature values.

Figure 6A:
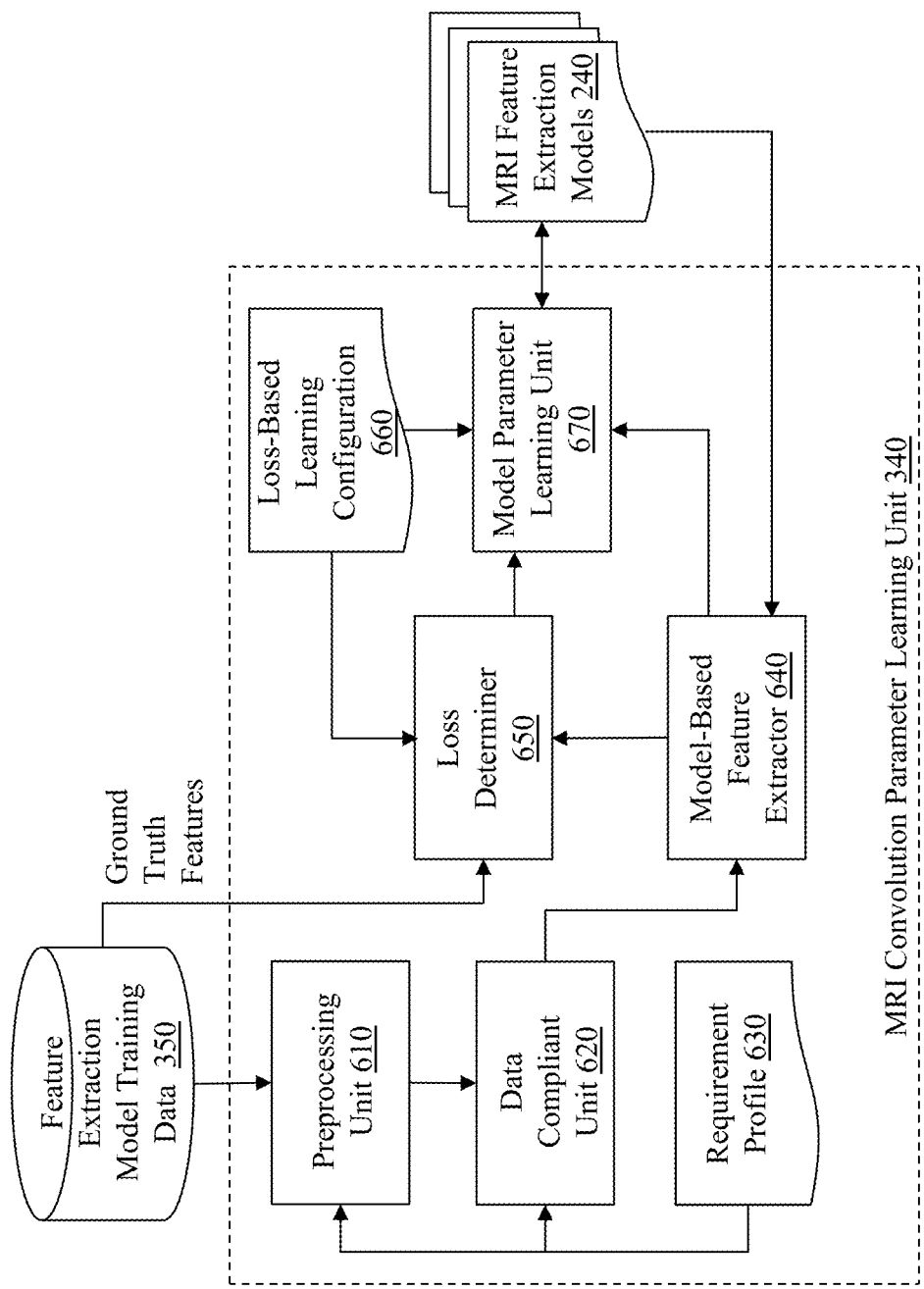
FIG. 6A depicts an exemplary high level system diagram of a MRI convolution kernel parameter learning unit, in accordance with an exemplary embodiment of the present teaching.

FIG. 6A depicts an exemplary high level system diagram of the MRI convolution kernel parameter learning unit 340, in accordance with an exemplary embodiment of the present teaching. As discussed herein, the MRI convolution kernel parameter learning unit 340 is provided to conduct learning, based on training data, of the weights and biases associated with rotation covariant kernels. In this illustrated embodiment, the MRI convolution parameter learning unit 340 comprises a model-based feature extractor 640, a loss determiner 650, and a model parameter learning unit 670. Optionally, the MRI convolution parameter learning unit 340 may also include a preprocessing unit 610 and a data compliant unit 620 for creating training data that is not only suitable for training M feature extraction models but also complies with certain requirements specified in, e.g., a requirement profile stored in 630, before the training data is used for training.

Figure 6B:
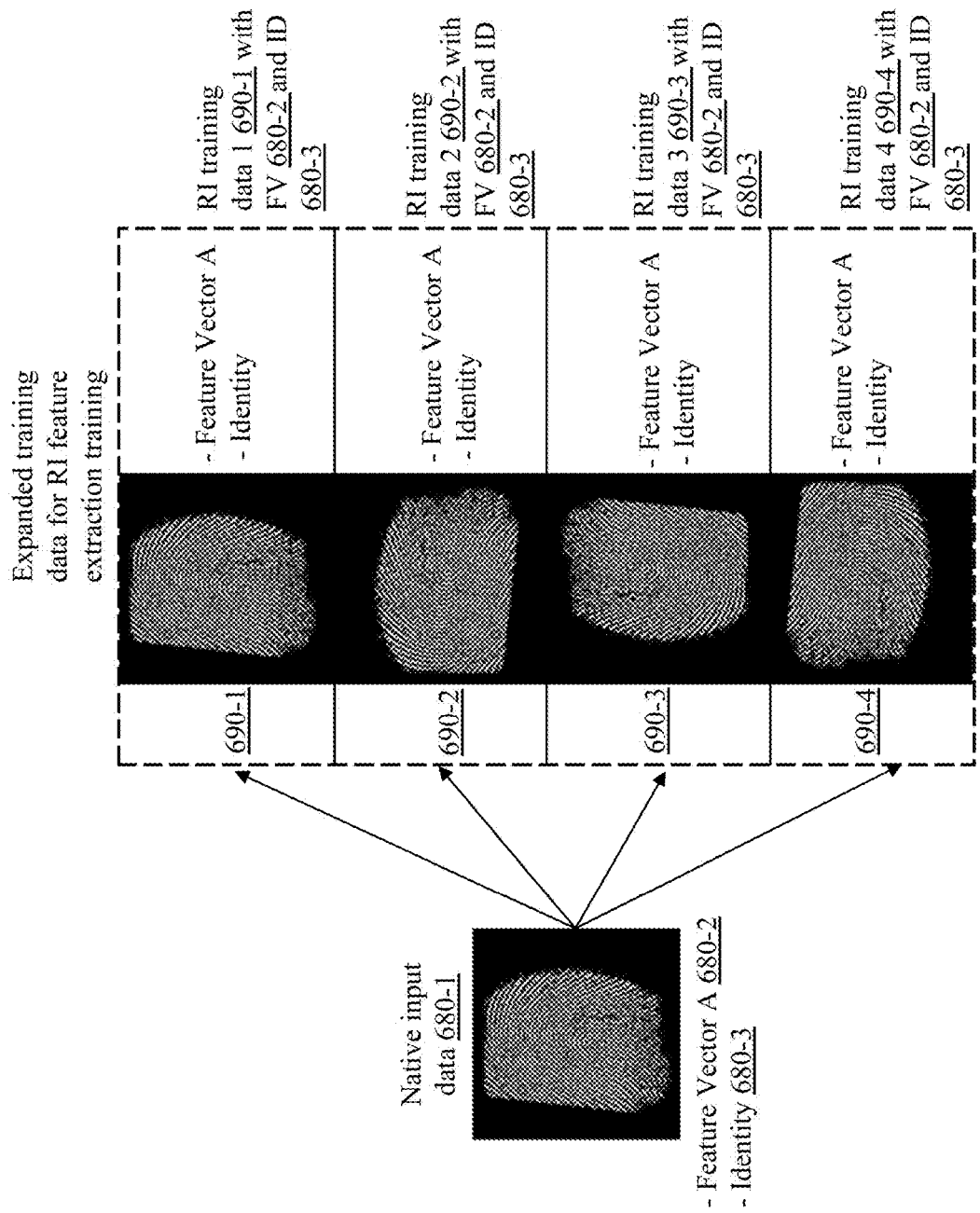
FIG. 6B shows an example of generating training data for learning rotation invariant feature extraction models, in accordance with an embodiment of the present teaching.

An example of such preprocessing includes generating training data suitable for training rotation invariant feature extraction. This is illustrated in FIG. 6B, where a native input image 680-1 has its ground truth feature vector 680-2 and an identity of the person associated with the fingerprint image 680-1. To maximize the use of native training image 680-1 for training rotation invariant feature extraction, the native image can be rotated to generate multiple rotated images, shown in FIG. 6B as 690-1, 690-2, 690-3, and 690-4, obtained by rotating image 680-1 by 0°, 90°, 180°, and 270°, respectively. When features can be extracted in a rotation invariant manner, then the feature vector and the identity associated with each of the rotated images remain the same, i.e., the rotated image 690-2 has the same feature vector 680-2 and identity 680-3 as that for image 680-1 even though the image itself has been rotated by 90°, the rotated image 690-3 has the same feature vector 680-2 and identity 680-3 as that for image 680-1 even though the image itself has been rotated by 180°, and the rotated image 690-4 has the same feature vector 680-2 and identity 680-3 as that for image 680-1 even though the image itself has been rotated by 270°. As the rotated images are given the same feature vector and identity, these rotated images (including the one without rotation) serve as good training data to optimize the model parameters to achieve rotation invariant feature extraction. Although this example is described using rotations in four directions, it is merely for illustration rather then limitation. Any number of rotations within 360° range can be implemented and the rotation may be performed with a specified increment, e.g., 90, 45, 20, 10, or 5. In some embodiments, the number of rotations used for generating RI training data may be consistent with the number of rotations used for generating the rotation covariant kernels.

Examples of processing to be applied to ensure compliance of training data with respect to certain requirements may include generating input images of a certain dimension (e.g., 256×256) with a certain number of channels (e.g., 3), or normalizing intensity values in training images to be within a specified range (e.g., [0, 1]). For example, the training images from the storage 350 or output from the preprocessing unit 610 may have different dimensions (due to, e.g., collected from different sources), such as 392×357, 512×512, or even 1024×512, but the required dimension for subsequent processing may be 256×256. As another example, it may be required that all intensity values of each pixel in each of the channels be in a particular normalized scope. In this case, the data compliant unit 620 is for putting all training data in a form that can be processed in batch by the model-based feature extractor 640.

Figure 6C:
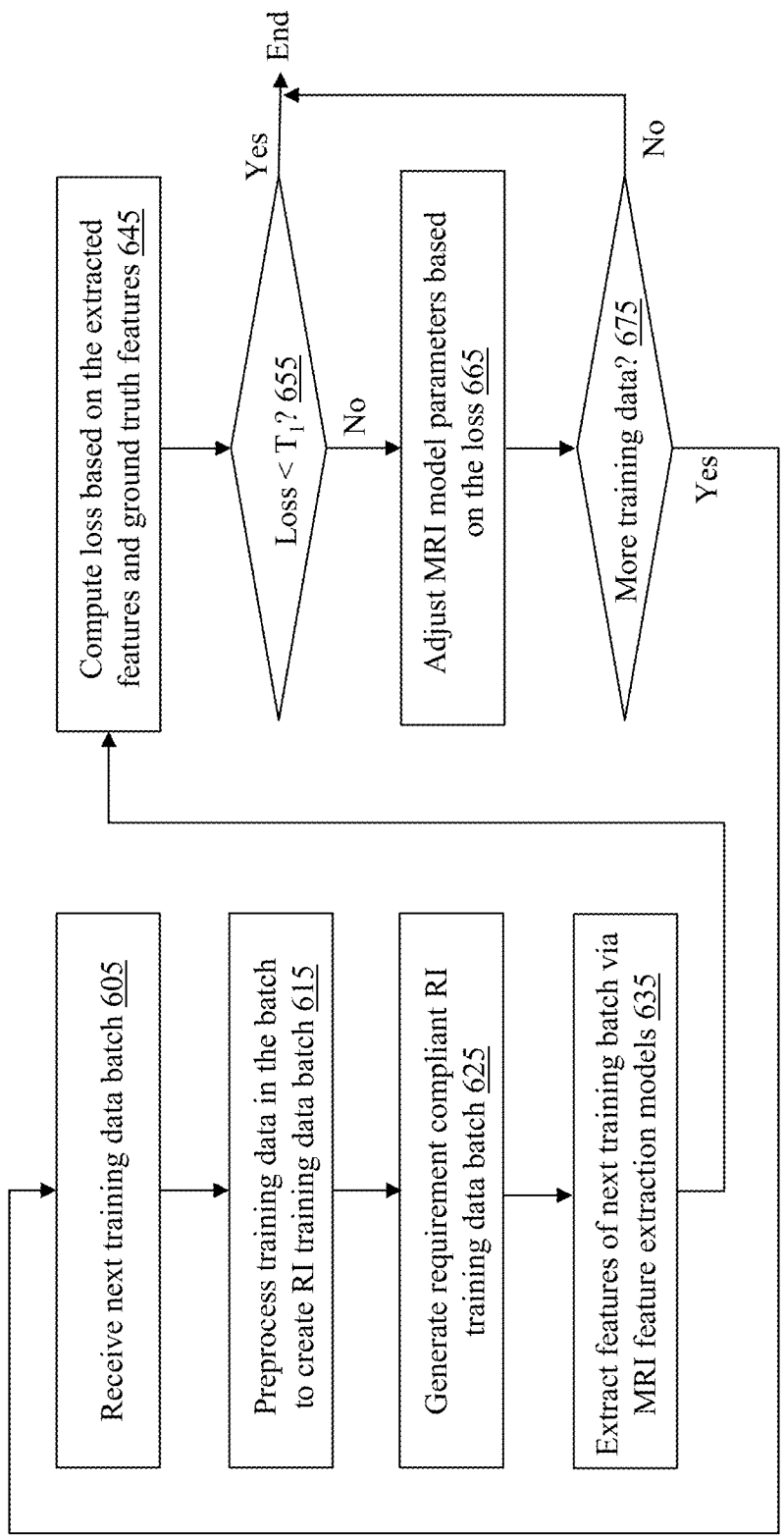
FIG. 6C is a flowchart of an exemplary process of a MRI convolution kernel parameter learning unit, in accordance with an exemplary embodiment of the present teaching.

FIG. 6C is a flowchart of an exemplary process of the MRI convolution kernel parameter learning unit 340, in accordance with an exemplary embodiment of the present teaching. As discussed herein, in processing input images using CNN framework, data are often input in batches. Without loss of generality, the discussion below is based on input image batches for training the RI feature extraction models 240. A special case of a batch is a single input image with batch size B=1. At 605, a native training data batch is received. The training images and their ground truth features/identifiers are preprocessed, by the preprocessing unit 610 at 615, to generate expanded RI feature training data batch, as discussed with respect to FIG. 6B. Prior to the training using the RI training data, the data compliant unit 620 may further process the RI training data to generate, at 625, training data that comply with various requirements specified by the requirement profile stored in 630.

With the appropriately positioned images in the RI training data batch, the model-based feature extractor 640 accesses the RI feature extraction models 240 and extracts, at 635, feature vectors for the training images included in the RI training data batch. The feature vectors are obtained, by the model-based feature extractor 640 through a CNN framework with multiple layers of convolution plus max pooling using rotation covariant kernels as specified by the MRI feature extraction models 240. Such extracted feature vectors are then used, by the loss determiner 650, to compute, at 645, a loss based on the extracted feature vectors and the ground truth feature vectors associated with the images included in the RI training batch.

If the loss is smaller than a predetermined threshold, determined at 655, the learning process may end. It is commonly known that over many iterations in the learning process, the loss is gradually decreased towards convergence. When the learning converges, the learning process may terminate before the next update process. If the loss is still higher than the predetermined threshold, the model parameters (weights and biases) are adjusted, by the model parameter learning unit 670 through minimizing the loss. In some embodiments, adjustments made to the model parameters are determined based on learning configurations specified in a loss-based learning configuration stored in 660. The adjustments to the model parameters effectively create updated RI feature extraction models in 240, which can then be used to extract RI features of the next RI training data batch in the next iteration. When there is more training data, determined at 675, the next iteration of the learning process starts by returning to step 605. Otherwise, the learning process ends.

Although FIGS. 6A-6B discuss a learning process for learning RI feature extraction models, consistent with what is depicted in FIGS. 2A and 2B (where it is generally described to have separate MRI feature extraction models 240 and MRI based fingerprint recognition models 270), feature extraction and classification may often be achieved by the same neural network, as depicted in FIGS. 4A and 4F, where the output of the last several fully connected networks is classification result. Via such a network framework, parameters embedded in the neural network may be learned or optimized simultaneously for both feature extraction and classification during the training process. That is, the separate MRI feature extraction models 240 and MRI based recognition models 270 may be combined as embeddings of a CNN so that all parameters of the CNN, including the RC kernels and their biases, as well as the weights on the connections within the layers and between the layers can be learned at the same time during training. In this case, the parameters are optimized with respect to classification results, which also optimizes the kernel parameters for extracting rotation invariant features at multiple convolution layers. In the embodiments where the MRI feature extraction models 240 and the MRI based fingerprint recognition models 270 are merged as embeddings of a CNN.

Figure 7:
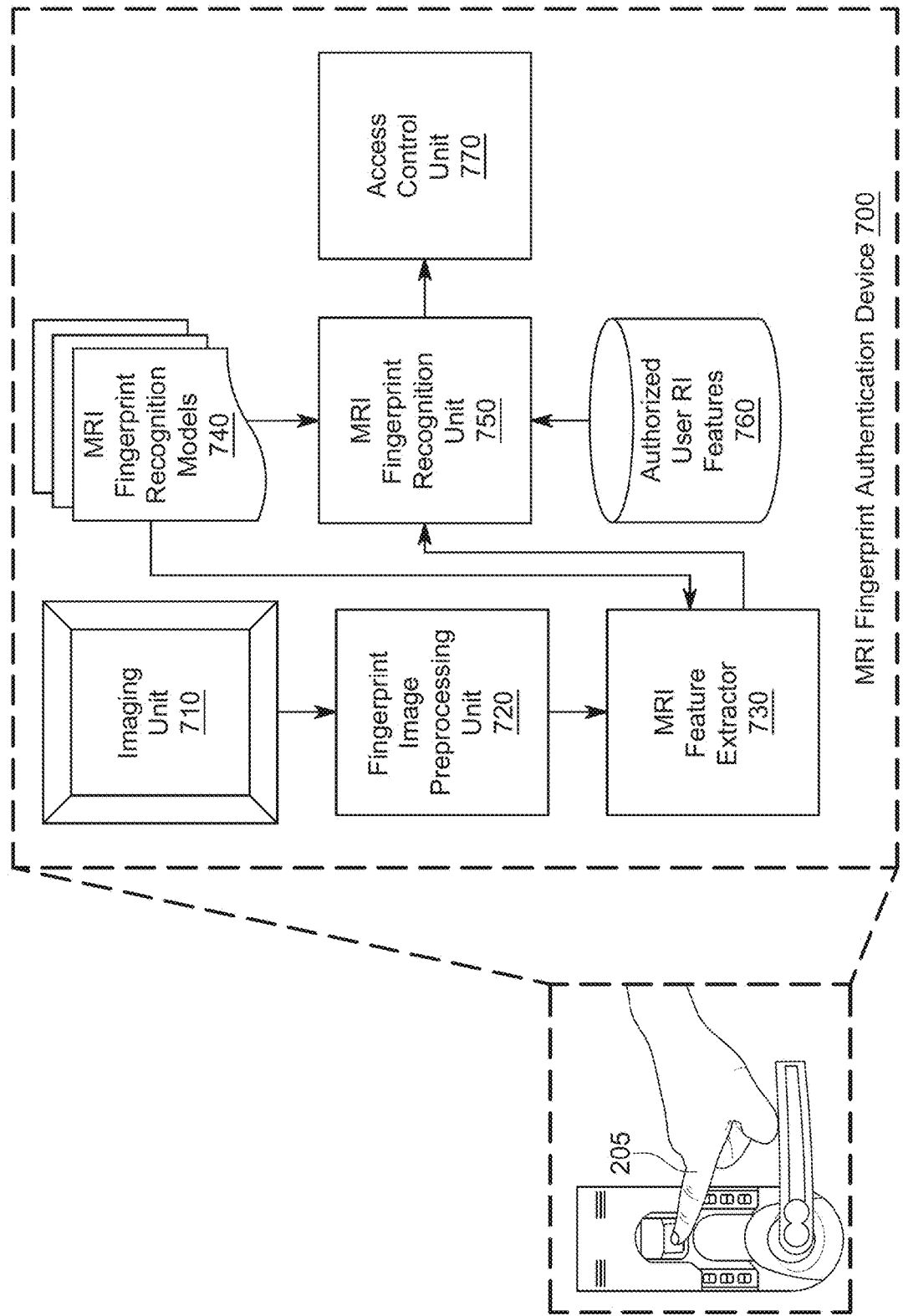
FIG. 7 depicts an exemplary high level system diagram of a multilevel rotation invariant fingerprint authentication device, in accordance with an alternative embodiment of the present teaching.

FIG. 7 depicts an exemplary high level system diagram of a multilevel rotation invariant fingerprint authentication device 700, in accordance with an alternative embodiment of the present teaching. As discussed herein, device 700 is different from the device 200 in the models, where device 200 provide separate feature extraction models 240 and recognition models 270, while the device 700 merges these models in a coherent CNN framework as an MRI fingerprint recognition models 740 that can be used for both MRI feature extraction and for recognition based on such extracted MRI features. The merged models in this illustrated embodiment correspond to a CNN with embedded network parameters (including RC kernel weights, biases, and weights on network connections) learned to optimize the classification performance. When rotation invariant training data are generated as described herein with respect to FIG. 6A, the trained embedded parameters of the CNN enable rotation invariant feature extraction and recognition.

Figure 8A:
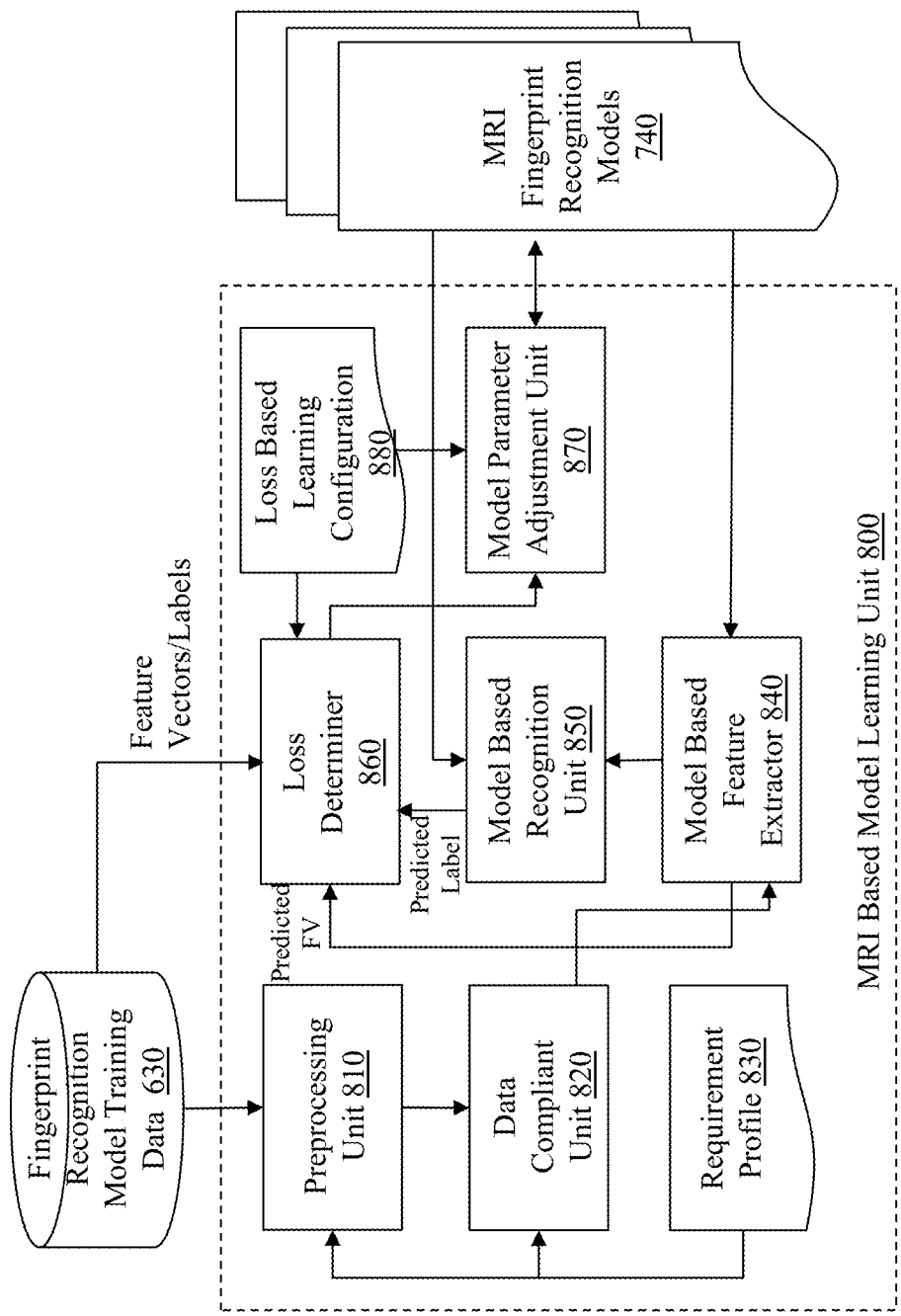
FIG. 8A depicts an exemplary high-level system diagram of a MRI based recognition model learning unit, in accordance with an exemplary embodiment of the present teaching.
Figure 8B:
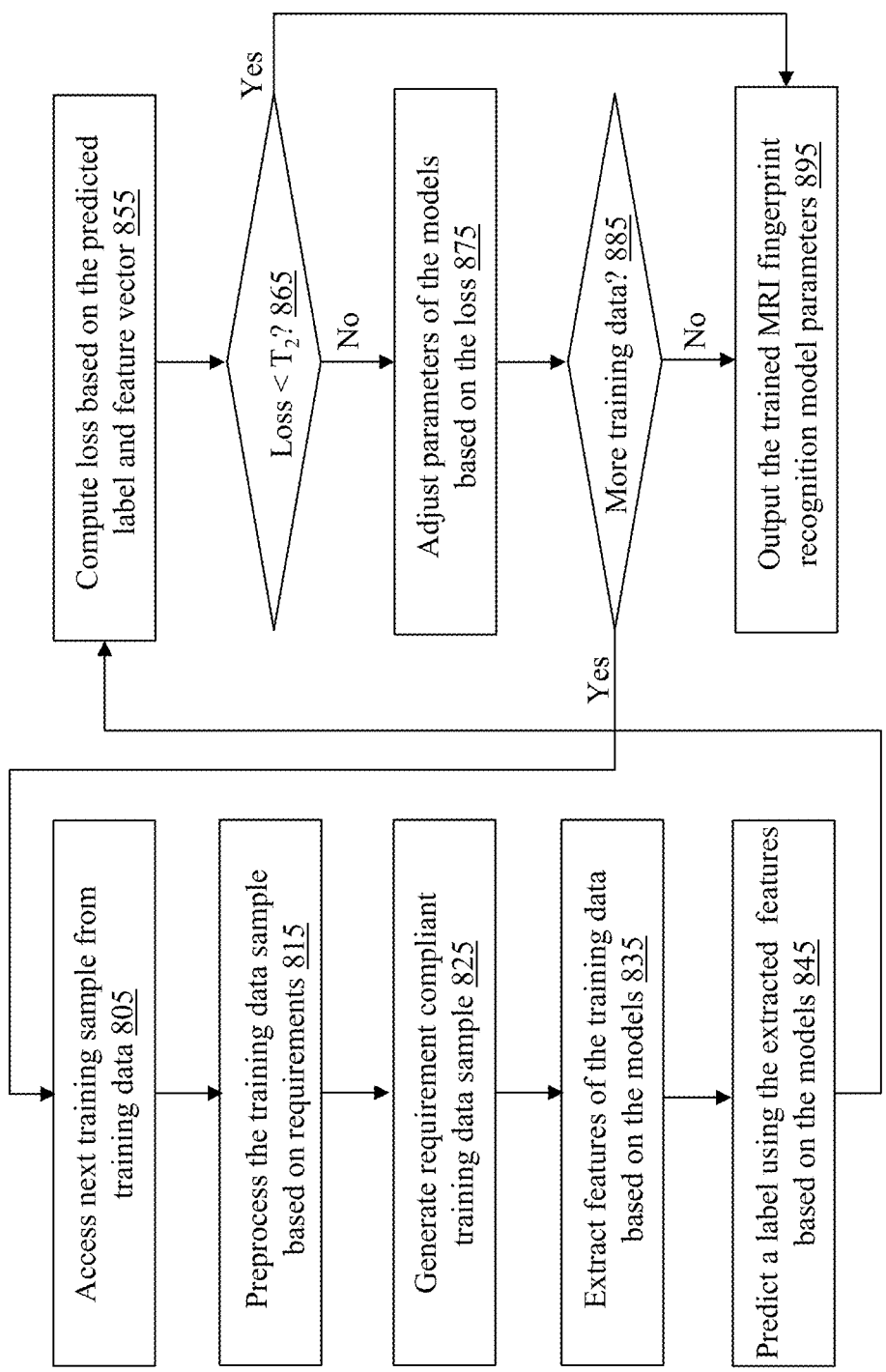
FIG. 8B is a flowchart of an exemplary process of a MRI based recognition model learning unit, in accordance with an exemplary embodiment of the present teaching.

The MRI fingerprint recognition models 740 in FIG. 7 are obtained via machine learning. This is illustrated in FIGS. 8A and 8B. FIG. 8A depicts an exemplary high-level system diagram of an MRI based model learning unit 800, in accordance with an exemplary embodiment of the present teaching. The construct of the MRI based model learning unit 800 and components therein are similar to what is shown in FIG. 7A. But the learning process may differ. First, the M features are extracted using the models 740 and the estimated feature vectors (output of the multi layers of convolution) are used in determining the loss. In this way, the weights and biases used in the RC kernels may be accordingly adjusted in consideration of the loss attributed to the incorrect features. Second, at the same time, the models 740 are used to predict labels of input images (by the fully connected layers 430) based on features output from the layers of convolution and max pooling operations (410-2, ..., 410-2) and such predicted labels are also used in computing the loss so that model parameters embedded are adjusted in consideration of the loss attributed by the incorrect classification. Thus, the loss function incorporates both loss from the perspective of rotation invariant feature extraction and the perspective of classification. An exemplary formulation of the loss function configured may be:

$$\ell_{ArcFace} = -\log\left(\frac{\exp(s(\cos(\theta_{y_i} + m)))}{\exp(s(\cos(\theta_{y_i} + m))) + \sum_{j=1, j \neq y_i}^{n} \exp(s(\cos\theta_j))}\right)$$

where m represents the distance among centroids representing different classes, $\theta_{y_i}$ denotes the angle between the feature vector from model-based feature extractor 840 and that of the centroid feature vector of a class, i is the ith index of the descending batch stochastic gradient, $\theta_j$ denotes the angle between the feature vector and that of the centroid feature vector of class j, and n represents the number of classes. Based on this loss function, the optimization goal is to learn the parameters to maximize the angles between feature vectors of different classes, e.g., all being greater than m, and at the same time, to minimize the in-class angles between features vectors from the same class. As can be seen, the input to the loss determiner 860 include the predicted feature vector from the model-based feature extractor 840 as well as the centroid feature vector of each class so that the angles between the predicted feature vector and the centroid feature vectors of different classes can be determined in order to compute the loss. Therefore, loss so determined measures the classification loss (and implicitly the loss in feature extraction as well).

FIG. 8B is a flowchart of an exemplary process of an MRI based model learning unit 800, in accordance with an exemplary embodiment of the present teaching. At 805, next training sample (image) is accessed. As discussed herein, the training images and their ground truth features/identifiers are preprocessed, by the preprocessing unit 810 at 815, to generate expanded RI feature training data, as discussed herein with respect to FIG. 6B. In addition, prior to the training using the RI training data, the data compliant unit 820 may optionally process the RI training data to generate, at 825, training data that comply with various requirements specified by the requirement profile stored in 830.

With the appropriately processed RI training data, the model-based feature extractor 840 extracts, at 835, feature vectors for the training images based on the MRI fingerprint recognition models 740, via, e.g., the multiple layers of convolution plus max pooling using rotation covariant kernels weights/biases incorporated in the MRI fingerprint recognition models 740. Such extracted feature vectors are then sent to the loss determiner 850. The extracted feature vector is also used by the model-based recognition unit 850 to predict, at 845, a class label corresponding to the training image based on the MRI fingerprint recognition models 740 (the fully connected layers 430). The predicted label is also sent to the loss determiner 860, where a loss is determined, at 855, based on the extracted feature vector, the centroid feature vectors of different classes, as well as the ground truth label from the training data.

If the loss is smaller than a predetermined threshold, determined at 865, the learning process may end and the currently learned MRI fingerprint recognition model parameters may be output at 895. If the loss is still higher than the predetermined threshold (not yet converged), the model parameters are adjusted, by the model parameter adjustment unit 870 through minimizing the loss. In some embodiments, adjustments made to the model parameters are determined based on learning configurations specified in a loss-based learning configuration stored in 860. The adjustments to the model parameters create updated MRI fingerprint recognition models 740, which can then be used to extract RI features and predict class label for the next RI training data in the next iteration. The learning process continues until the models converges or when there is no more training data.

Figure 9:
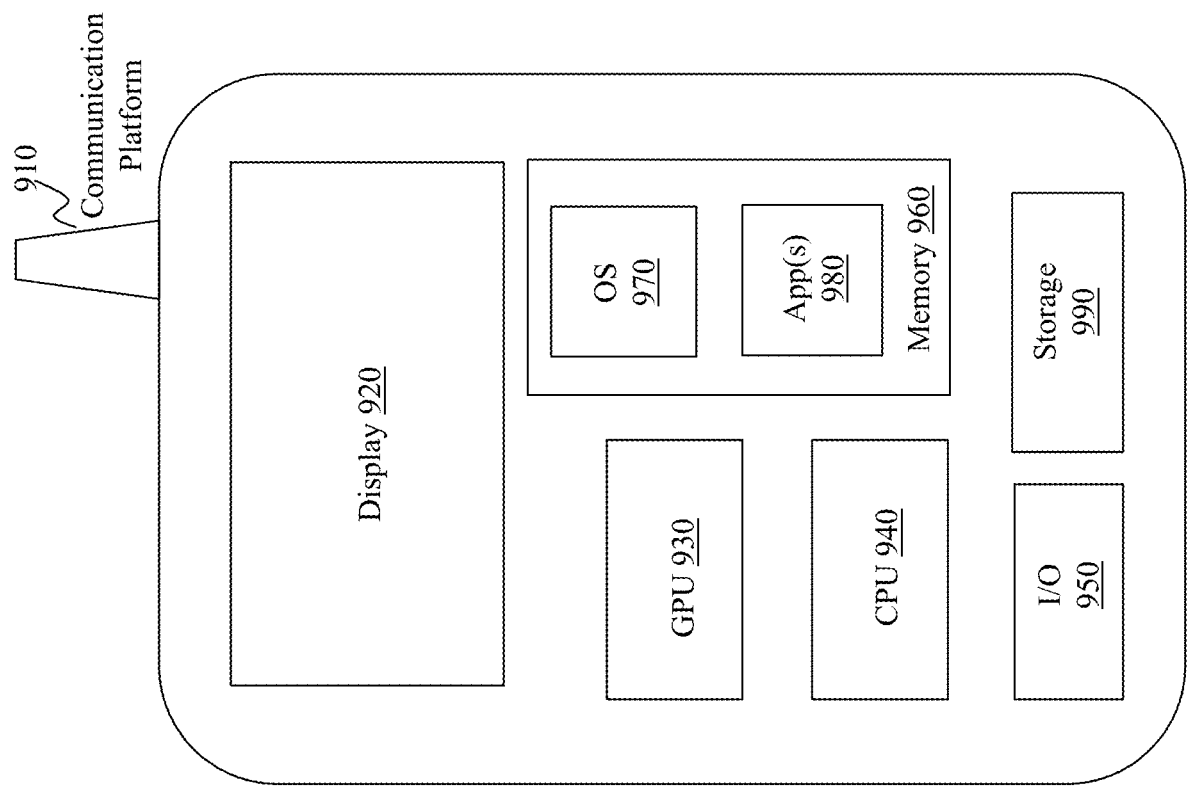
FIG. 9 is an illustrative diagram of an exemplary mobile device architecture that may be used to realize a specialized system implementing the present teaching in accordance with various embodiments.

FIG. 9 is an illustrative diagram of an exemplary mobile device architecture that may be used to realize a specialized system implementing the present teaching in accordance with various embodiments. In this example, the user device on which the present teaching may be implemented corresponds to a mobile device 800, including, but not limited to, a smart phone, a tablet, a music player, a handled gaming console, a global positioning system (GPS) receiver, and a wearable computing device, or in any other form factor. Mobile device 900 may include one or more central processing units ("CPUs") 940, one or more graphic processing units ("GPUs") 930, a display 920, a memory 960, a communication platform 910, such as a wireless communication module, storage 990, and one or more input/output (I/O) devices 950. Any other suitable component, including but not limited to a system bus or a controller (not shown), may also be included in the mobile device 900. As shown in FIG. 9, a mobile operating system 970 (e.g., iOS, Android, Windows Phone, etc.), and one or more applications 980 may be loaded into memory 960 from storage 990 in order to be executed by the CPU 940. The applications 980 may include a user interface or any other suitable mobile apps for information analytics and management according to the present teaching on, at least partially, the mobile device 900. User interactions, if any, may be achieved via the I/O devices 950 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 10:
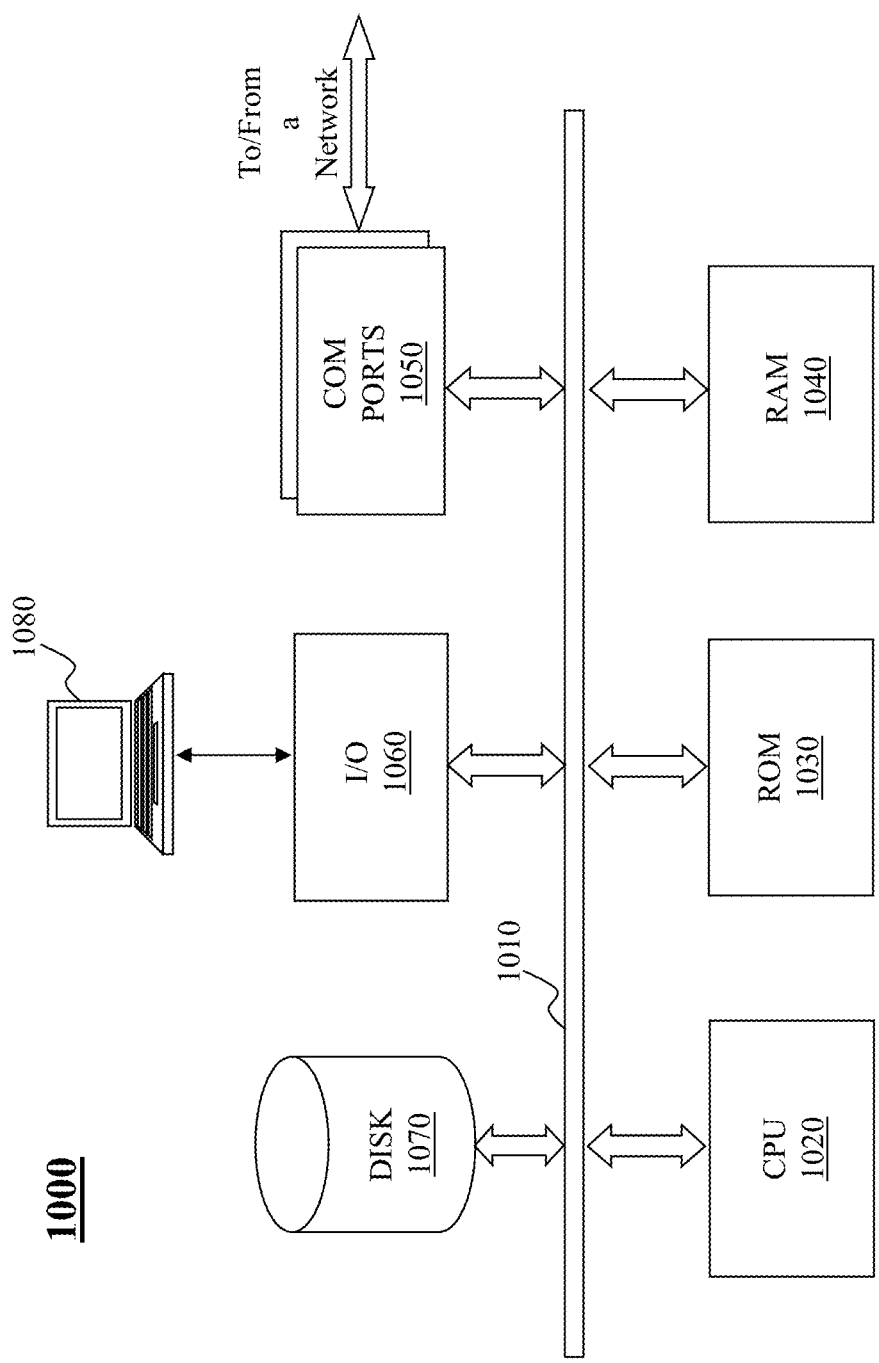
FIG. 10 is an illustrative diagram of an exemplary computing device architecture that may be used to realize a specialized system implementing the present teaching in accordance with various embodiments.

FIG. 10 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 1000 may be used to implement any component or aspect of the framework as disclosed herein. For example, the information analytical and management method and system as disclosed herein may be implemented on a computer such as computer 1000, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 1000, for example, includes COM ports 1050 connected to and from a network connected thereto to facilitate data communications. Computer 1000 also includes a central processing unit (CPU) 1020, in the form of one or more processors, for executing program instructions. The exemplary computer platform includes an internal communication bus 1010, program storage and data storage of different forms (e.g., disk 1070, read only memory (ROM) 1030, or random-access memory (RAM) 1040), for various data files to be processed and/or communicated by computer 1000, as well as possibly program instructions to be executed by CPU 1020. Computer 1000 also includes an I/O component 1060, supporting input/output flows between the computer and other components therein such as user interface elements 1080. Computer 1000 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one processor, a memory, and a communication platform enabling connection to a network for biometric authentication, comprising:
generating rotation invariant (RI) training data with rotation invariant characteristics based on a plurality of training samples, each of which includes an image capturing biometric information of a person, a feature vector extracted from the image, and a label indicative of an identity of the person;
conducting machine learning based on the RI training data to learn weights of each of rotation covariant (RC) convolution kernels for each of a plurality of convolution layers;
receiving an input image with fingerprint information captured therein related to a person to be authenticated;
preprocessing the input image to obtain an initial feature map;
at each of the plurality of convolution layers, processing a feature map based on the RC convolution kernels for the layer to output an RC feature map, wherein the feature map is one of the initial feature map and an output RC feature map from a previous one of the plurality of convolution layers, and the RC feature map output by the last one of the plurality of convolution layers corresponds to a feature vector representing fingerprint features of the person in a rotation invariant manner; and
authenticating the person based on the feature vector.

2. The method of claim 1, wherein
the RC convolution kernels, when convolving with an input fingerprint image, facilitate extraction of fingerprint features that vary with a direction of the fingerprint captured in the input fingerprint image;
each of the RC convolution kernels is created with respect to a specific angle and corresponds to a rotated version of the other RC convolution kernels.

3. The method of claim 2, wherein the last layer of the plurality of convolution layers is capable of outputting the feature vector based on a configuration in accordance with a number of the plurality of layers, the RC convolution kernels for each layer, and one or more parameters applied in performing convolutions at each of the plurality of convolution layers.

4. The method of claim 2, wherein the step of processing the feature map at the convolution layer to output a RC feature map comprises:
convolving the feature map using the RC convolution kernels for the layer to generate respective convolution results, each of which is a two-dimensional map recording at each location of the map a response to a convolution performed at the location using one of the RC convolution kernels associated with a respective angle; and
performing a reduce max operation to obtain the RC feature map based on the convolution results by, at each location of the RC feature map,
selecting a maximum response among the responses recorded at the location of the respective convolution results, and
assigning the maximum response to the location of the RC feature map.

5. The method of claim 1, wherein the step of generating the RI training data comprises:
with respect to each of the plurality of training samples,
generating multiple rotated images via rotating the image of the training sample by a respective angle, wherein the rotating angle increments each time by a pre-determined amount,
associating each of the multiple rotated images the feature vector and the label of the image, and
creating a set of training samples based on the multiple rotated images that have the same feature vector and label, wherein
each set of training samples has images capturing biometric information of the same person but with image content rotated yet having the same feature vector and label.

6. The method of claim 1, wherein the step of conducting the machine learning comprises:
with respect to each training sample in the RI training data,
performing convolutions at the plurality of convolution layers using current weights of the RC convolution kernels for the respective layers to obtain an estimated feature vector for the training sample,
performing classification of the training sample based on the estimated feature vector and parameters associated with a classification network to obtain an estimated label for the training sample,
computing a loss based on the estimated feature vector, the estimated label, the feature vector of the training sample, and the label of the training sample, and
modifying the weights of the RC convolution kernels for the plurality of convolution layers and the parameters associated with the classification network by minimizing the loss.

7. Machine readable and non-transitory medium having information recorded thereon for biometric authentication, wherein the information, when read by the machine, causes the machine to perform the following steps:
generating rotation invariant (RI) training data with rotation invariant characteristics based on a plurality of training samples, each of which includes an image capturing biometric information of a person, a feature vector extracted from the image, and a label indicative of an identity of the person;
conducting machine learning based on the RI training data to learn weights of each of rotation covariant (RC) convolution kernels for each of a plurality of convolution layers;
receiving an input image with fingerprint information captured therein related to a person to be authenticated;
preprocessing the input image to obtain an initial feature map;
at each of the plurality of convolution layers, processing a feature map based on the RC convolution kernels for the layer to output an RC feature map, wherein the feature map is one of the initial feature map and an output RC feature map from a previous one of the plurality of convolution layers, and the RC feature map output by the last one of the plurality of convolution layers corresponds to a feature vector representing fingerprint features of the person in a rotation invariant manner; and authenticating the person based on the feature vector.

8. The medium of claim 7, wherein the RC convolution kernels, when convolving with an input fingerprint image, facilitate extraction of fingerprint features that vary with a direction of the fingerprint captured in the input fingerprint image;

each of the RC convolution kernels is created with respect to a specific angle and corresponds to a rotated version of the other RC convolution kernels.

9. The medium of claim 8, wherein the last layer of the plurality of convolution layers is capable of outputting the feature vector based on a configuration in accordance with a number of the plurality of layers, the RC convolution kernels for each layer, and one or more parameters applied in performing convolutions at each of the plurality of convolution layers.

10. The medium of claim 8, wherein the step of processing the feature map at the convolution layer to output a RC feature map comprises:

convolving the feature map using the RC convolution kernels for the layer to generate respective convolution results, each of which is a two-dimensional map recording at each location of the map a response to a convolution performed at the location using one of the RC convolution kernels associated with a respective angle; and performing a reduce max operation to obtain the RC feature map based on the convolution results by, at each location of the RC feature map, selecting a maximum response among the responses recorded at the location of the respective convolution results, and assigning the maximum response to the location of the RC feature map.

11. The medium of claim 7, wherein the step of generating the RI training data comprises:

with respect to each of the plurality of training samples, generating multiple rotated images via rotating the image of the training sample by a respective angle, wherein the rotating angle increments each time by a pre-determined amount, associating each of the multiple rotated images the feature vector and the label of the image, and creating a set of training samples based on the multiple rotated images that have the same feature vector and label, wherein each set of training samples has images capturing biometric information of the same person but with image content rotated yet having the same feature vector and label.

12. The medium of claim 7, wherein the step of conducting the machine learning comprises:

with respect to each training sample in the RI training data, performing convolutions at the plurality of convolution layers using current weights of the RC convolution kernels for the respective layers to obtain an estimated feature vector for the training sample, performing classification of the training sample based on the estimated feature vector and parameters associated with a classification network to obtain an estimated label for the training sample, computing a loss based on the estimated feature vector, the estimated label, the feature vector of the training sample, and the label of the training sample, and modifying the weights of the RC convolution kernels for the plurality of convolution layers and the parameters associated with the classification network by minimizing the loss.

13. A system for biometric authentication, comprising:

a multilevel rotation invariant (MRI) based model learning unit implemented using a processor and configured for:

generating rotation invariant (RI) training data with rotation invariant characteristics based on a plurality of training samples, each of which includes an image capturing biometric information of a person, a feature vector extracted from the image, and a label indicative of an identity of the person, and conducting machine learning based on the RI training data to learn weights of each of rotation covariant (RC) convolution kernels for each of a plurality of convolution layers;

an imaging unit implemented using a processor and configured for receiving an input image with fingerprint information captured therein related to a person to be authenticated;

an image preprocessing unit implemented using a processor and configured for preprocessing the input image to obtain an initial feature map;

an MRI feature extractor implemented using a processor and configured for processing, at each of the plurality of convolution layers, a feature map based on the RC convolution kernels for the layer to output an RC feature map, wherein the feature map is one of the initial feature map and an output RC feature map from a previous one of the plurality of convolution layers, and the RC feature map output by the last one of the plurality of convolution layers corresponds to a feature vector representing fingerprint features of the person in a rotation invariant manner; and an MRI recognition unit implemented using a processor and configured for authenticating the person based on the feature vector.

14. The system of claim 13, wherein the RC convolution kernels, when convolving with an input fingerprint image, facilitate extraction of fingerprint features that vary with a direction of the fingerprint captured in the input fingerprint image;

each of the RC convolution kernels is created with respect to a specific angle and corresponds to a rotated version of the other RC convolution kernels.

15. The system of claim 14, wherein the last layer of the plurality of convolution layers is capable of outputting the feature vector based on a configuration in accordance with a number of the plurality of layers, the RC convolution kernels for each layer, and one or more parameters applied in performing convolutions at each of the plurality of convolution layers.

16. The system of claim 14, wherein the MRI feature extractor is configured for outputting a RC feature map by:

convolving the feature map using the RC convolution kernels for the layer to generate respective convolution results, each of which is a two-dimensional map recording at each location of the map a response to a convolution performed at the location using one of the RC convolution kernels associated with a respective angle; and performing a reduce max operation to obtain the RC feature map based on the convolution results by, at each location of the RC feature map, selecting a maximum response among the responses recorded at the location of the respective convolution results, and assigning the maximum response to the location of the RC feature map.

17. The system of claim 13, wherein the RI training data with rotation invariant characteristics is generated by:

with respect to each of the plurality of training samples, generating multiple rotated images via rotating the image of the training sample by a respective angle, wherein the rotating angle increments each time by a pre-determined amount, associating each of the multiple rotated images the feature vector and the label of the image, and creating a set of training samples based on the multiple rotated images that have the same feature vector and label, wherein each set of training samples has images capturing biometric information of the same person but with image content rotated yet having the same feature vector and label.

18. The system of claim 13, wherein the MRI based model learning unit is further configured for the machine learning by:

with respect to each training sample in the RI training data, performing convolutions at the plurality of convolution layers using current weights of the RC convolution kernels for the respective layers to obtain an estimated feature vector for the training sample, performing classification of the training sample based on the estimated feature vector and parameters associated with a classification network to obtain an estimated label for the training sample, computing a loss based on the estimated feature vector, the estimated label, the feature vector of the training sample, and the label of the training sample, and modifying the weights of the RC convolution kernels for the plurality of convolution layers and the parameters associated with the classification network by minimizing the loss.

\* \* \* \* \*